(12) United States Patent
Kawada

(10) Patent No.: US 8,005,271 B2
(45) Date of Patent: Aug. 23, 2011

(54) FACE DETECTION METHOD AND DIGITAL CAMERA

(75) Inventor: Yukihiro Kawada, Saitama-ken (JP)

(73) Assignee: FujiFilm Corporation, Tokyo (JP)

( * ) Notice: Subject to any disclaimer, the term of this patent is extended or adjusted under 35 U.S.C. 154(b) by 685 days.

(21) Appl. No.: 12/139,283

(22) Filed: Jun. 13, 2008

(65) Prior Publication Data

US 2008/0310726 A1 Dec. 18, 2008

(30) Foreign Application Priority Data

Jun. 18, 2007 (JP) ................................ 2007-160530

(51) Int. Cl.
*G06K 9/00* (2006.01)
(52) U.S. Cl. ......... 382/118; 382/190; 396/123; 396/128
(58) Field of Classification Search .................. 382/118, 382/159, 224, 190, 275, 225
See application file for complete search history.

(56) References Cited

U.S. PATENT DOCUMENTS

2002/0102024 A1* 8/2002 Jones et al. .................. 382/225
2007/0292019 A1 12/2007 Terakawa

FOREIGN PATENT DOCUMENTS

JP 2004-334836 A 11/2004
JP 2006-350704 A 12/2006

* cited by examiner

*Primary Examiner* — Nick Corsaro
*Assistant Examiner* — Siamak Harandi
(74) *Attorney, Agent, or Firm* — Birch, Stewart, Kolasch & Birch, LLP

(57) ABSTRACT

A face detection method is provided, including: classifying into levels time-wise continuously captured images by increasing/reducing the total number of pixels; selecting sequentially and reading out image data for all of the levels using read-out units of the same size of pixels, or a smaller size of pixels, as those of the image with the smallest size of pixels; carrying out face detection processing by extracting candidate levels in which face image data is present, based on the read-out image data for each of the levels; and, when repeating the face detection processing, setting the number of candidate levels for face detection processing from the second time onward as less than the total number of levels. A digital camera incorporating the face detection method is also disclosed.

20 Claims, 33 Drawing Sheets

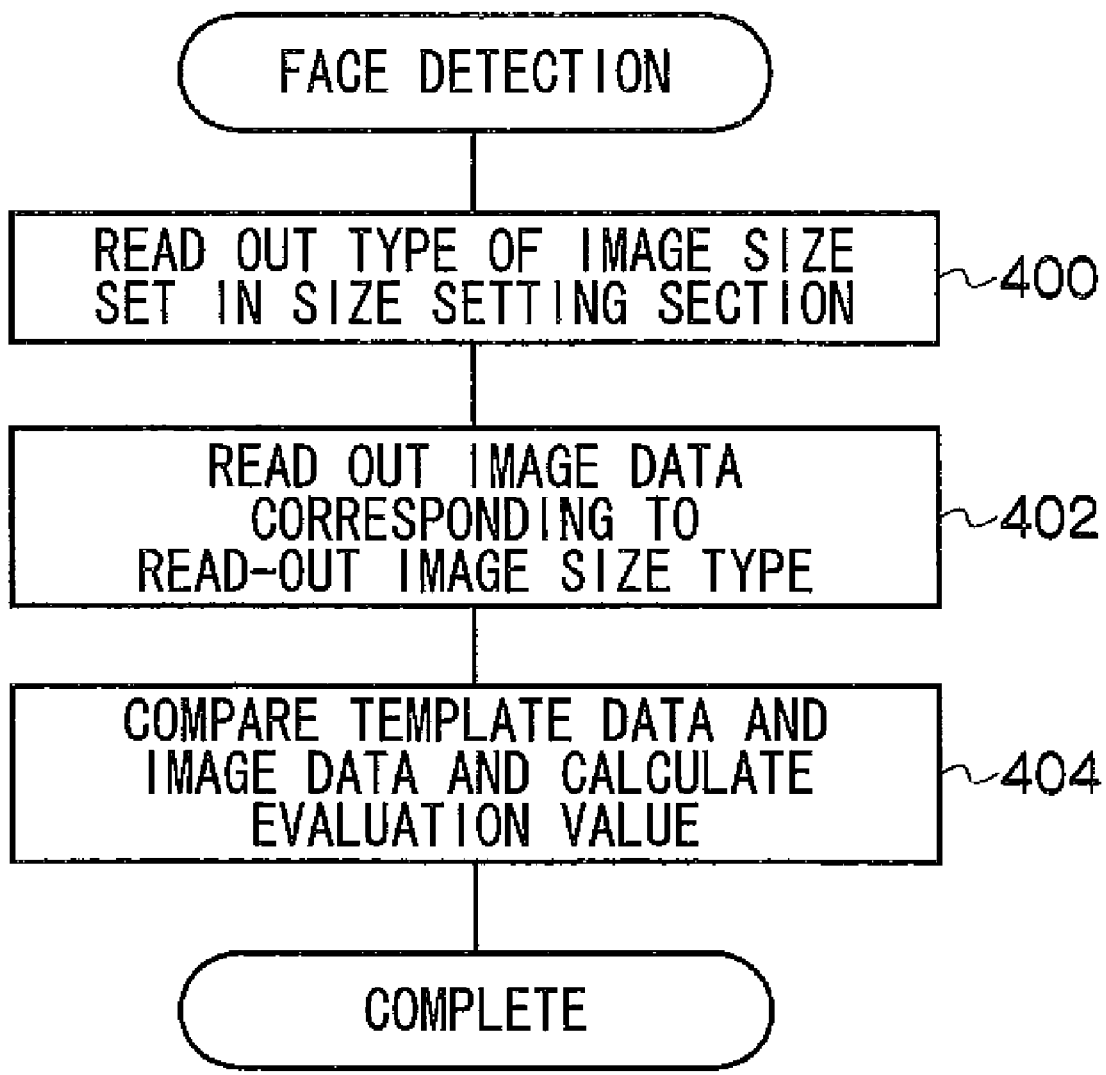

FIG. 6A

| 0 | 1 | 2 | 3 | 4 | 5 | 6 | 7 | 8 | 9 |

DETECT IMAGE SIZES 5, 6

FIG. 6B

| 0 | 1 | 2 | 3 | 4 | 5 | 6 | 7 | 8 | 9 |

RESTRICT TO IMAGE SIZES 4 TO 7

FIG. 6C

| 0 | 1 | 2 | 3 | 4 | 5 | 6 | 7 | 8 | 9 |

DETECT IMAGE SIZES 4, 5

FIG. 6D

| 0 | 1 | 2 | 3 | 4 | 5 | 6 | 7 | 8 | 9 |

RESET TO IMAGE SIZES 3 TO 6

FIG. 6E

| 0 | 1 | 2 | 3 | 4 | 5 | 6 | 7 | 8 | 9 |

| FACE SIZE | MAXIMUM | | | | | | | | MINIMUM |
|---|---|---|---|---|---|---|---|---|---|
| IMAGE SIZE (LEVEL) | 0 | 1 | 2 | 3 | 4 | 5 | 6 | 7 | 8 | 9 |
| 1/n OF SIDE | 1.19 | 1.50 | 1.90 | 2.40 | 3.00 | 3.84 | 4.80 | 6.00 | 7.68 | 9.60 |

| | PATTERN |
|---|---|
| STRAIGHT-ON | a |
| | b |
| | c | a: IMAGE SIZE LEVEL 0 TO 7
b: IMAGE SIZE LEVEL 3 TO 8
c: IMAGE SIZE LEVEL 6 TO 9

FIG. 9

| FACING DIRECTION OF FACE | LARGEST IMAGE SIZE (LEVEL) | STRAIGHT-ON |||||||||| |
|---|---|---|---|---|---|---|---|---|---|---|---|
| | | PREVIOUS LARGEST IMAGE SIZE (LEVEL) |||||||||| |
| | | 0 | 1 | 2 | 3 | 4 | 5 | 6 | 7 | 8 | 9 |
| STRAIGHT-ON | 0 | a | a | a | a | a | - | - | - | - | - |
| | 1 | a | a | a | a | a | - | - | - | - | - |
| | 2 | a | a | a | a | a | - | - | - | - | - |
| | 3 | a | a | a | a | a | a | a | a | - | - |
| | 4 | a | a | a | a | b | a | a | a | a | - |
| | 5 | b | b | b | b | b | b | b | b | b | b |
| | 6 | b | b | b | b | b | b | b | b | b | b |
| | 7 | c | c | c | c | c | c | c | c | c | c |
| | 8 | - | - | - | - | - | c | c | c | c | c |
| | 9 | - | - | - | - | - | - | c | c | c | c | a, b, c: CORRESPOND, RESPECTIVELY, TO THE PATTERN a, PATTERN b, AND PATTERN c OF FIG. 8B
a: IMAGE SIZE LEVEL 0 TO 7
b: IMAGE SIZE LEVEL 3 TO 8
c: IMAGE SIZE LEVEL 6 TO 9

----- TRANSITION WHEN DN TIMES IS EXCEEDED OR
NO FACE HAS BEEN DETECTED FOR SUCCESSIVE NN TIMES

NUMBERS INDICATE THE BASIS NUMBER OF ARRAYED PIXELS (DOTS)

NUMBERS INDICATE THE BASIS NUMBER OF ARRAYED PIXELS (DOTS)

NUMBERS INDICATE THE BASIS NUMBER OF ARRAYED PIXELS (DOTS)

FACE DETECTION METHOD AND DIGITAL CAMERA

CROSS-REFERENCE TO RELATED APPLICATION

This application claims priority under 35 USC 119 from Japanese Patent Application No. 2007-160530 filed Jun. 18, 2007, the disclosure of which is incorporated by reference herein

BACKGROUND OF THE INVENTION

1. Technical Field

The present invention relates to a face detection method and digital camera, and specifically relates to a face detection method and digital camera performing face detection according to face detection conditions, such as size of the face in a photographic object, facing direction of the face, and/or with respect to the upright direction.

2. Related Art

Conventionally, determination is made as to whether a face is present in image data, representing an object image-captured using a digital camera, and the characteristics of the face portion are extracted from the image data when a face is present, and correction is performed of the density, brightness and the like of the face portion.

This determination as to whether a face is present depends on whether the size of the face in the photographic object is large or small, and determination as to whether a face is present is made by enlarging and reducing the image size of image data, and deriving the closeness of match of portions of the image data successively clipped from the image data, against templates of a given size (surface area) having a face facing direction and inclination to the upright direction (see, for example, Japanese Patent Application Laid-Open (JP-A) No. 2006-350704).

However, the technique of JP-A No. 2006-350704 clips portions of image data for all image sizes of image data that has been enlarged or reduced, and the number of times cross-checking is performed against the templates is large, and so the face detection processing duration is long.

SUMMARY OF THE INVENTION

The present invention is made in consideration of the above circumstances, with the objective of carrying out high speed face detection by controlling the processing speed of face detection according to face detection conditions, such as the face size of a photographic object, the facing direction of a face therein, and the direction thereof to the upright direction.

A first aspect of the invention provides a face detection method including: classifying plural images, generated by enlargement or reduction of time-wise successively captured images according to plural specific multipliers, into levels by image size of the images; sequentially reading out at one read-out unit at a time the images classified into each of the levels, using as the read-out unit a size that is smaller than the smallest image size from the image sizes of the classified images; carrying out face detection processing to detect images in which it is determined that a face is present in portions of the image divided up into the read-out units, wherein when the face detection processing is repeatedly carried out to the time-wise successively captured images the number of candidate levels of the images used for the face detection processing carried out to the next image is set based on the level(s) of image size of images in which it has been determined there is a face present so that the number of candidate levels is set less than the total number of levels.

According to the first aspect plural images, generated by enlargement or reduction of time-wise successively captured images according to plural specific multipliers, are classified into levels by image size of the images, the images classified into each of the levels are sequentially read out at one read-out unit at a time, using as the read-out unit a size that is smaller than the smallest image size from the image sizes of the classified images, and face detection processing is carried out to detect images in which it is determined that a face is present in portions of the image divided up into the read-out units.

Then, when carrying out face detection processing to the next image, the number of candidate levels of the images used for the face detection processing carried out to the next image is set based on the level(s) of image size of images in which it has been determined there is a face present so that the number of candidate levels is set less than the total number of levels.

Accordingly, some of the image data levels, rather than all of the image data levels, can be made subject to face detection processing each time face detection processing is carried out, and it is possible to reduce the time required for face detection processing.

A second aspect of the invention provides the face detection method of the first aspect in which the settable number of candidate levels is set based on the image size(s) in which it has been determined that a face is present the previous time face detection processing was carried out.

According to the second aspect the number of settable candidate levels is dynamically set based on the image size of the image(s) in which it was determined that a face was present the previous time.

For each of the images classified into levels there is a greater impact generated on the face detection processing speed the larger the image size of the image. Therefore the number of candidate levels set for face detection processing for the next image is set based on the image size(s) in which it has been determined that a face is present the previous time face detection processing was carried out so that a fewer number of candidate levels is set for images of large image size, and a greater number of candidate levels is set for images of small image size, enabling the processing speed of face detection processing to be controlled.

A third aspect of the present invention provides the face detection method of the first or the second aspect, further including additionally setting a function for discriminating using an out-plane angle, representing the left-right facing direction of a face, as a parameter for subjecting to face detection processing, wherein the number of types of the out-plane angle to be subjected to face detection processing is set to be fewer as the image size of the classified images increases.

According to the third aspect, a function for discriminating using an out-plane angle, representing the left-right facing direction of a face, is additionally set as a parameter for subjecting to face detection processing, and the number of types of the out-plane angle to be subjected to face detection processing is set to be fewer as the image size of the classified images increases.

The number of times a small completely side-on face is captured in a photographic object is generally less than the number of times a straight-on face or angled face is captured. Accordingly, the time required for face detection processing may be reduced by excluding image data for detecting small faces (detection from image data of large image size) from subjecting to face detection.

A fourth aspect of the invention is the face detection method of the third aspect, in which the face detection processing is carried out within a region set in advance for each of the levels of image, the region being set according to the out-plane angle(s) in which a face has been determined to be present by the face detection processing the previous time.

According to the fourth aspect of the invention, face detection processing is carried out within a region set in advance for each of the levels of image, the region being set according to the out-plane angle(s) in which a face has been determined to be present by the face detection processing the previous time. There are generally few faces of right-side facing out-plane angle present at the right hand edge of image data for a photographic object. Accordingly, it is possible to reduce the time necessary face detection processing by changing the image data read-out region according to the out-plane angle of the face.

A fifth aspect of the invention is the face detection method of any one of the first to the fourth aspects, further including additionally setting a function for discriminating using an in-plane angle, representing the degree of angular rotation of a face to the upright direction, as a parameter for subjecting to face detection processing, wherein when the face detection processing is carried out repeatedly the number of patterns of the in-plane angle to be used in the face detection processing carried out to the next image is set to be fewer than the total number of the patterns, and the number of patterns are set so as to belong to a specific angular range around the in-plane angle in which a face was detected to be present the previous time.

According to the fifth aspect, a function is additionally set for discriminating using an in-plane angle, representing the degree of angular rotation of a face to the upright direction, as a parameter for subjecting to face detection processing, wherein when the face detection processing is carried out repeatedly the number of patterns of the in-plane angle to be used in the face detection processing carried out to the next image is set to be fewer than the total number of the patterns, and the number of patterns are set so as to belong to a specific angular range around the in-plane angle in which a face was detected to be present the previous time.

Such face detection processing sets plural patterns of the in-plane angle, representing the rotational angle of a face from the upright direction, as a parameter for subjecting to face detection, and carries out face detection processing of the images of level-classified image sizes with each of the in-plane angles.

The number of patterns of the in-plane angle to be used in the face detection processing carried out to the next image is set to be fewer than the total number of the patterns, and the number of patterns are set so as to belong to a specific angular range around the in-plane angle in which a face was detected to be present the previous time.

Accordingly, the time required for image data read out may be reduced, since the use of fewer in-plane angle patterns for face detection processing is made possible.

A sixth aspect of the present invention is the face detection method according to any one of the first to the fifth aspects, wherein the face detection processing is carried out within a region set in advance for each of the levels of image according to the image size of the images for each of the levels.

According to the sixth aspect, the face detection processing is carried out within a region set in advance for each of the levels of image according to the image size of the images for each of the levels.

Since generally the subject of a photographic object is positioned toward the middle of the image data, when, for example, a small size of face is captured, the time required for face detection processing can be reduced by carrying out face detection processing within a region set according to the image size, since detection is possible even within a narrowed region of face detection.

The seventh aspect is the provision of a digital camera incorporating the face detection method of any one of the first to the sixth aspects.

According to the present invention, as explained above, an effect is obtained of enabling high speed face detection by setting the conditions for carrying out face detection the current time such that the number of times of image data read-out processing is reduced, based on the conditions of carrying out face detection the previous time, such as the size of face of a photographic object detected in face detection the previous time, the facing direction of a face therein, and the direction thereof to the upright direction.

BRIEF DESCRIPTION OF THE DRAWINGS

Exemplary embodiments of the present invention will be described in detail based on the following figures, wherein:

FIG. 5 is a flow chart for explaining details of processing performed for face detection according to the first exemplary embodiment of the present invention;

FIG. 6A is an explanatory diagram for explaining a specific example of the face detection processing shown in FIG. 3, showing the formation of image data specific to different image sizes 0 to 9 (full range of sizes);

FIG. 6B is an explanatory diagram for explaining a specific example of the face detection processing shown in FIG. 3, showing where the presence of a face is predicted in image sizes 5 and 6;

FIG. 6C is an explanatory diagram for explaining a specific example of the face detection processing shown in FIG. 3, showing selection of image sizes 4 to 7 such that four image sizes are included, where the presence of a face is predicted in image sizes 5 and 6;

FIG. 6D is an explanatory diagram for explaining a specific example of the face detection processing shown in FIG. 3, showing where the presence of a face is predicted in image sizes 4 and 5;

FIG. 6E is an explanatory diagram for explaining a specific example of the face detection processing shown in FIG. 3, showing re-selection of image sizes 3 to 6 such that four image sizes are included, with both adjacent image sizes to image sizes 4 and 5;

FIG. 9 is a pattern transition table for specifying the image size selection width used for the next face detection;

DETAILED DESCRIPTION

First Exemplary Embodiment

Figure 1:
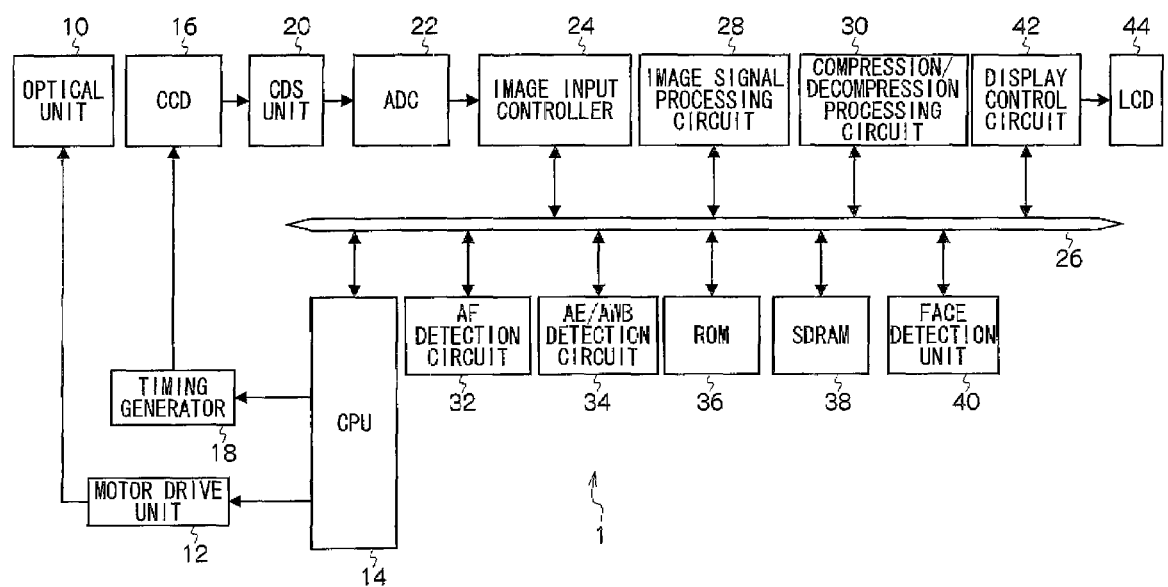
FIG. 1 is a block diagram showing a configuration of a control system of a digital camera according to a first exemplary embodiment of the present invention.

FIG. 1 is a block diagram showing a configuration of a control system for a digital camera 1 according to a first exemplary embodiment, explanation will now be given of the configuration of the digital camera 1 according to the first exemplary embodiment with reference to FIG. 1.

An optical unit 10 that includes plural focusing lenses for focusing a photographic object is provided with a focal point adjusting motor, a zoom motor, and an aperture drive motor (these motors being omitted in the figures, and referred to collectively as "each of the motors"). The optical unit 10 is connected to a motor drive unit 12. The motor drive unit 12 supplies drive signals to each of the motors.

The motor drive unit 12 is connected to a CPU (Central Processing Unit) 14 that undertakes overall control of the operation of the apparatus. Namely, the motor drive unit 12 outputs drive signals to each of the motors under control of the CPU 14.

A CCD (Charge Coupled Device) 16 is disposed at the rear face side (the opposite side to the face that faces the photographic object) of the optical unit 10. The CCD 16 has functionality for converting light into an analog signal representing the amount of light received that has been received from the photographic object. The CCD 16 is connected to a timing generator 18 and to a CDS (Correlated Double Sampling) unit 20.

The timing generator 18 generates a timing signal for driving the CCD 16, and supplies the timing signal to the CCD 16. The CCD 16 outputs analogue data to the CDS unit 20 in synchronization with the timing signal.

The timing generator 18 is connected to a CPU 14. The timing generator 18 generates the timing signal under the control of the CPU 14.

The CDS unit 20 is also connected to an ADC (Analog to Digital Converter) 22. The CDS unit 20 carries out correlated double sampling and the like on the analogue data input from the CCD 16. The CDS unit 20 outputs analogue data to the ADC 22.

The ADC 22 is connected to an image input controller 24. The ADC 22 converts analogue data input from the CDS unit 20 into digital data. The ADC 22 outputs the digital data to the image input controller 24.

The image input controller 24 is connected to a system BUS 26. The image input controller 24 controls the output of digital data input from the ADC 22 to the system BUS 26, and controls the storing thereof in a specific region of a later described SDRAM (Synchronous Dynamic Random Access Memory) 38.

In addition to the image input controller 24, the CPU 14, a image signal processing circuit 28, a compression/decompression processing circuit 30, an AF (Auto Focus) detection circuit 32, an AE (Auto Exposure)/AWB (Automatic White Balance) detection circuit 34, a ROM (Read Only Memory) 36, the SDRAM 38, a face detection unit 40, and a display control circuit 42 are also connected to the system BUS 26, such that signals can be exchanged therebetween.

The image signal processing circuit 28 controls execution of various image processing on input image data, and controls storing to the SDRAM 38.

The compression/decompression processing circuit 30 performs image data compression using a specific format (for example, JPEG (Joint Photographic Experts Group) format, motion JPEG format, MPEG (Moving Picture Experts Group) format), and also performs decompression of compressed image data according to the compression format.

The AF detection circuit 32 detects the contrast value of the image data in order to adjust the focus of the focusing lenses.

The AE/AWB detection circuit 34 detects the EV (Exposure Value) for determining the aperture number and the speed, based on the integrated value of the integrated R, G, and B signals of a single frame, and the AE/AWB detection circuit 34 also detects the digital gain according to the type of light source of the colors R, G and B. Namely, the AE/AWB detection circuit 34 detects physical quantities necessary for adjusting the exposure and the white balance to the optimum values thereof.

The ROM 36 is a non-volatile memory, and stores programs, data and the like for executing the various functions of the digital camera 1.

The SDRAM 38 is a volatile memory, and is used as a work area for temporarily storing image data when various functions of the digital camera 1 are executed.

The face detection unit 40 executes processing for determining whether or not there is a face present in the input image data (described in detail later).

The display control circuit 42 is connected to a LCD (liquid Crystal Display) 44 for displaying images, represented by image data obtained by the CCD 16, menu screens, and the like. The display control circuit 42 generates a signal for displaying on the LCD 44 an image, a menu screen or the like, represented by image data input through the system BUS 26, and supplies the signal to the LCD 44.

In this digital camera 1, when there is a "face" present in the captured image, corrections are made to emphasis the "face", namely parameters for print processing, such as saturation, density, brightness, hue, are corrected.

Face detection is therefore performed in the face detection unit 40 of the first exemplary embodiment.

A known technique for detecting a "face" uses templates representing faces of specific sizes (surface areas) as the method of face detection, and the first exemplary embodiment is also based on such a method.

However, in the face detection of the first exemplary embodiment, the processing sequence is further simplified for the cross-checking of the template size against the face image size.

Figure 2:
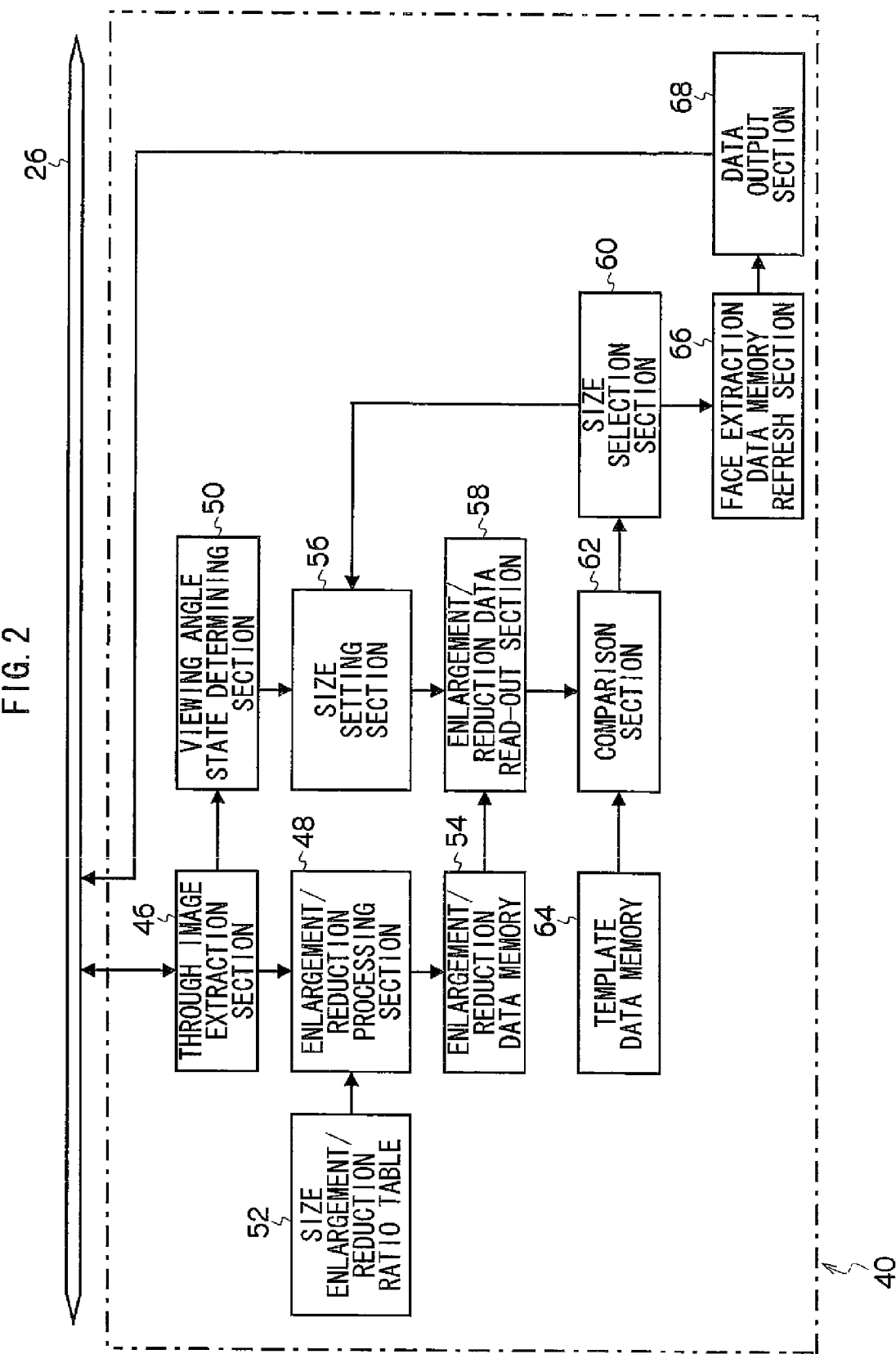
FIG. 2 is a block diagram showing a configuration of a face detection unit for performing face detection processing according to the first exemplary embodiment of the present invention.

Explanation will now be given, using FIG. 2, of a configuration of the face detection unit 40 for executing face detection. It should be noted that each of the blocks in FIG. 2 are not limitations on the hardware configuration of the face detection unit 40, and are just classifications by function.

A through-image extraction section 46 is connected to the system BUS 26, to an enlargement/reduction processing section 48, and to a viewing angle state determining section 50.

The through-image extraction section 46 extracts from the system BUS 26 through-image data obtained by time-wise successive image capture in the CCD 16 (through-image data is, for example, processed at 30 frames/second), this extraction being one frame at a time. The extracted through-image data is output to the enlargement/reduction processing section 48 and to the viewing angle state determining section 50. The enlargement/reduction processing section 48 is connected to a size enlargement/reduction ratio table 52 and to an enlargement/reduction data memory 54.

The enlargement/reduction processing section 48 performs enlargement processing and reduction processing on the image size of the through-image data extracted in the through-image extraction section 46, in order to carry out cross-checking, and forms image data according to image size, classified by levels.

The enlargement processing and reduction processing of the through-image data image size in the enlargement/reduction processing section 48 is by: sequentially reading out specific ratios stored in the size enlargement/reduction ratio table 52; then multiplying the vertical and horizontal lengths of the image data by each of the read-out specific ratios, while maintaining a uniform aspect ratio of the image data and while also not changing the resolution thereof; and generating image data of image sizes classified by levels.

Specific ratios corresponding to the image size levels obtainable for image size enlargement processing and reduction processing are stored in the size enlargement/reduction ratio table 52. In the first exemplary embodiment, there is a specific ratio for each of levels 0 to 9 stored for forming image size specific image data for the 10 levels (image sizes 0 to 9) by image size enlargement processing and reduction processing of the through-image data extracted in the through-image extraction section 46. It should be noted that the number of levels described above is just an example, and obviously it is not necessary always to have 10 levels.

When the enlargement processing and reduction processing is completed, the enlargement/reduction processing section 48 outputs the formed image size specific image data 0 to 9 to the enlargement/reduction data memory 54.

The enlargement/reduction data memory 54 is connected to the enlargement/reduction data read-out section 58. The enlargement/reduction data memory 54 stores the image size specific image data 0 to 9 formed by image size enlargement processing and reduction processing of through-image data in the enlargement/reduction processing section 48.

The viewing angle state determining section 50 is connected to a size setting section 56 for setting size identification data representing the image size level of the image data to be used for face detection. Face detection is preformed again when the image captured photographic object has changed from the photographic object captured the previous time. The viewing angle state determining section 50 therefore determines whether the photographic object image captured the current time has changed from the photographic object image captured the previous time.

It should be noted that for determination as to whether the image captured photographic object has changed from the photographic object image captured the previous time, an evaluation value is firstly calculated which represent the relationship between data showing the brightness of a center position region of the through-image data extracted the previous time against data showing the brightness of the same region in the through-image data extracted the current time.

Determination is that the photographic object image captured has changed when the evaluation value is equal to, or greater than, a specific value.

In the viewing angle state determining section 50, when it is determined that the image captured photographic object has changed from the photographic object image capture the previous time, the viewing angle state determining section 50 outputs a reset signal to the size setting section 56 in order to reset the size identification data set in the size setting section 56. The size setting section 56 resets the size identification data based on the reset signal, and also sets anew the size identification data representing all or some of the image size levels 0 to 9.

The size setting section 56 is connected to the enlargement/reduction data read-out section 58 and the size selection section 60, and the enlargement/reduction data read-out section 58 is connected to a comparison section 62. The enlargement/reduction data read-out section 58 reads out the size identification data set by the size setting section 56, and reads out the image size image data matching the read out size identification data from the enlargement/reduction data memory 54. The enlargement/reduction data read-out section 58 outputs the image data read out from the enlargement/reduction data memory 54 to the comparison section 62.

The comparison section 62 is connected to a template data memory 64, in which template data representing templates of specific sizes (surface areas) are stored, and to a size selection section 60. The comparison section 62 reads out template data from the template data memory 64. The comparison section 62 compares the read-out template data with the image data output from the enlargement/reduction data read-out section 58. Determination is made as to whether or not a face is present in the image data by this comparison. After determination, the comparison section 62 outputs the determined result to the size selection section 60.

It should be noted that a similar technique to known techniques may be used for the comparison method of the image data with the template data, and so explanation thereof is simplified. In the enlargement/reduction processing section 48 successive comparisons are made of clipped portions of image data with the template data, for respective image data that has been image size enlargement processed/reduction processed and is the same size (same aspect ratio and same surface area) as the template data, by successively clipping each portion of the image data that has been divided into portions (referred to below as "portion image data") of a size that is smaller than the smallest size of the image sizes 0 to 9 (for example, by moving one pixel at a time). This size is referred to below as the "read-out unit".

More specifically, an evaluation value is calculated, representing the relationship between the brightness value of the clipped portion image data against the brightness value of the template data, and a face is predicted to be present in the clipped portion image data when the evaluation value is a value that is the same as, or greater than, a threshold value.

It should be noted that that in the exemplary embodiment plural images, which have been generated by enlarging or reducing the through-image according to plural specific multipliers, are classified into image levels according to the image size, and images for each classified level are read out successively by the above read-out units. Face extraction processing for detecting images in which a face is determined to be present is successively performed to the portions divided into read-out units for each frame of through-image data extracted by the through-image extraction unit 46.

The size selection section 60 is connected to a face extraction data memory refresh section 66. The size selection section 60 selects the image size of the through-image data to be used for the next face detection based on the determination result output from the comparison section 62. After selection, the size selection section 60 outputs the selected image size level to the size setting section 56 and to the face extraction data memory refresh section 66.

The image size in which a face is predicted to be present by the comparison section 62 and the adjacent image sizes thereto are used as the basis for selection of the image sizes for use in the face detection for the next through-image data. Therefore, there is no necessity to perform face detection using the image data formed in all of the 0 to 9 specific image sizes when face detection is performed for the second and subsequent times on the through-image data, enabling a reduction in processing time.

Figure 3:
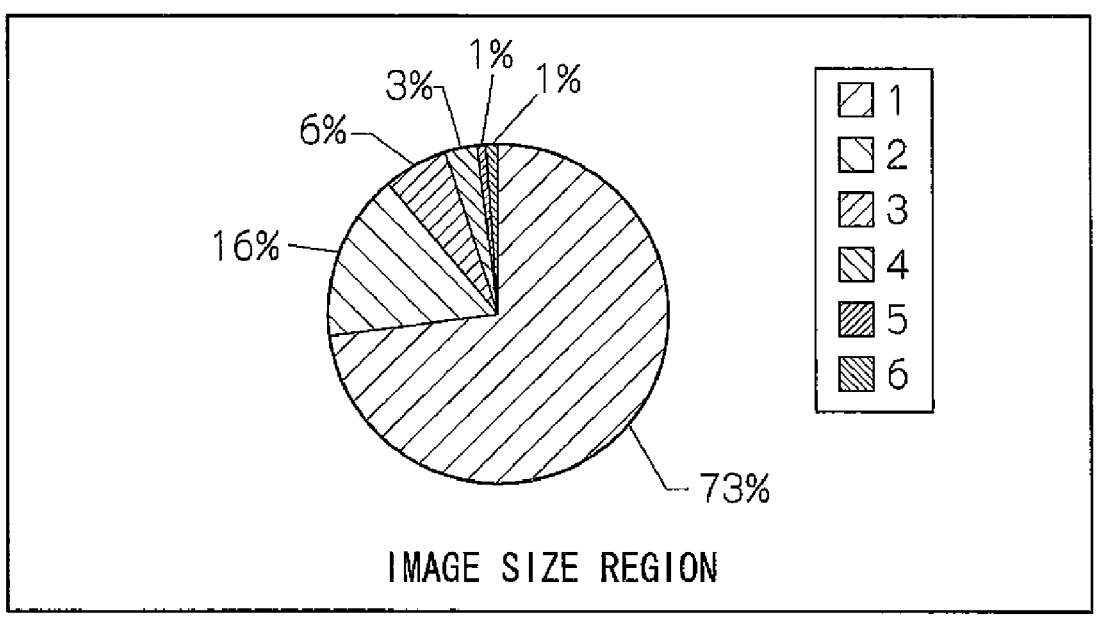
FIG. 3 is graph showing face detection capability with a 98% probability, by determining whether a face is present for the image size, and then in the next face detection using image sizes close to that image size, covering four image sizes.

FIG. 3 shows statistically the face size width from a general photographic object, and shows that if by face detection processing the previous time there were two image sizes in which it was determined that there is a face present from the image sizes 0 to 9, then by covering both adjacent image sizes to these image sizes in the next face detection, namely 4 image sizes, face detection with a 98% certainty is possible.

Accordingly, the size selection section 60, considers 4 image sizes for the next through-image data, with the two adjacent image sizes to the sizes in which the presence of a face is predicted by the comparison section 62, and selects the image sizes to be used in the second or subsequent face detections, and size identification data representing the selected image size levels is set by the size setting section 56.

The face extraction data memory refresh section 66 is connected to the data output section 68, as shown in FIG. 2. The face extraction data memory refresh section 66 extracts face portion(s) included in the image data of the image size(s) for which it has been determined in the size selection section 60 that a face is present. Then, after temporarily storing the data relating to the extracted face portion(s), the stored data is output to the data output section 68.

The data output section 68 is connected to the system BUS 26. The data output section 68 outputs to the system BUS 26 data relating to the image data stored in the face extraction data memory refresh section 66, in order to correct the brightness, correct the density and the like of the extracted face portion(s).

Explanation will now be given of operation of the digital camera 1 according to the first exemplary embodiment.

Image capture of the photographic object is first carried out in the CCD 16, through the optical unit 10, and then analog signals for each of the colors R (red), G (green), and B (Blue) of the photographic object are output in sequence, the output analog signals are input to the CDS unit 20, and correlated double sampling processing and the like is executed.

Then analog signals are input to the ADC 22 from the CDS unit 20, and the ADC 22 converts each of the R, G, and B analog signals into drive signals and forms digital data, outputting the digital data to the image input controller 24. The image input controller 24 accumulates the image data input from the ADC 22 and temporarily stores the image data in a specific region of the SDRAM 38.

Further, the image data stored in the SDRAM 38 is read out by the image signal processing circuit 28, under control of the CPU 14, and white balance is performed thereto by applying a digital gain according to the physical quantities detected by the AE/AWB detection circuit 34. The image signal processing circuit 28 also: performs gamma processing and sharpness processing and generates image data of a specific number of bits (for example 8 bits); performs YC signal processing and generates a brightness signal Y and chroma signals Cr, Cb (referred to below as "the YC signal"); and stores the YC signal in a region of the SDRAM 38 different to the above region.

Further, the LCD 44 is configured so as to be able to be used as a finder by displaying a through-image obtained by successive image capture by the CCD 16, and when the LCD 44 is used in this manner as a finder, the generated YC signal is output successively through the display control circuit 42 to the LCD 44. The LCD 44 accordingly displays a through-image.

Further, in the face detection unit 40 the through-image extraction section 46 acquires image data relating to the above through-image. Image size enlargement processing and reduction processing is performed by the enlargement/reduction processing section 48 after acquisition. The comparison section 62 then determines whether there is a face present in the image data of whichever size, by successive comparisons of the brightness values at the size representing the read-out unit for each of the plural image data obtained by image size enlargement processing and reduction processing, with the brightness values of the specific size of template data.

Explanation will now be given of processing in the face detection unit 40, with reference to the flow chart shown in FIG. 4.

At step 300, one frame of through-image data, obtained by successive image capture by the CCD 16, is extracted in the through-image extraction section 46. The extracted through-image data is then output to the enlargement/reduction processing section 48 and to the viewing angle state determining section 50.

Next, in step 302, determination is made as to whether or not there is any change to the image captured photographic object from the photographic object image captured the previous time. In the viewing angle state determining section 50, the image data extracted by the through-image extraction section 46 the previous time is compared with the image data extracted the current time. After comparison, if it is determined that there has been a change in the image captured photographic object since the photographic object image captured the previous time, then the routine proceeds to step 304. If it is determined that there has been no change then the routine proceeds to step 314. It should be noted that when the through-image data extracted in step 300 is the through-image data used for performing face detection processing for the first frame then the routine always proceeds to step 304.

In step 304, since face detection is performed for image sizes 0 to 9 (the full range of sizes) the size identification data is set in the size setting section 56 so as to represent the image size levels 0 to 9.

Next, at step 306, in the enlargement/reduction processing section 48, the relevant specific ratios, based on the size identification data set by the setting section 56, are read-out in sequence from the size enlargement/reduction ratio table 52 where the specific ratios for each of the image sizes 0 to 9 have been stored in advance, and then the routine proceeds to step 308.

Next, at step 308, the specific ratios read out in the processing of step 306 are used as multipliers for the vertical and horizontal lengths of the through-image extracted in the through-image extraction section 46, and image data specific to the relevant image sizes is formed, and all of the image data formed is stored in the enlargement/reduction data memory 54.

Next, in step 310, the above described face detection processing is executed for each of the image data formed in step 308.

Explanation will now be given of details of the processing for face detection in this step 310, with reference to the flow chart shown in FIG. 5.

First, in step 400, the enlargement/reduction data read-out section 58 reads out the image size levels shown in the size identification data that has been set in the size setting section 56. Next, in step 402, the enlargement/reduction data read-out section 58 reads out the image data from the enlargement/reduction data memory 54 of the corresponding size from the size identification data read-out in step 400.

In step 404, the comparison section 62 reads-out template data from the template data memory 64, and carries out a comparison of the read-out template data and the image data read out by the enlargement/reduction data read-out section 58.

The comparison method of the image data and the template data is, as described above, by calculation of an evaluation value representing the relationship of the brightness value of each of the image data formed for the specific image sizes against the brightness value of the template data.

Figure 4:
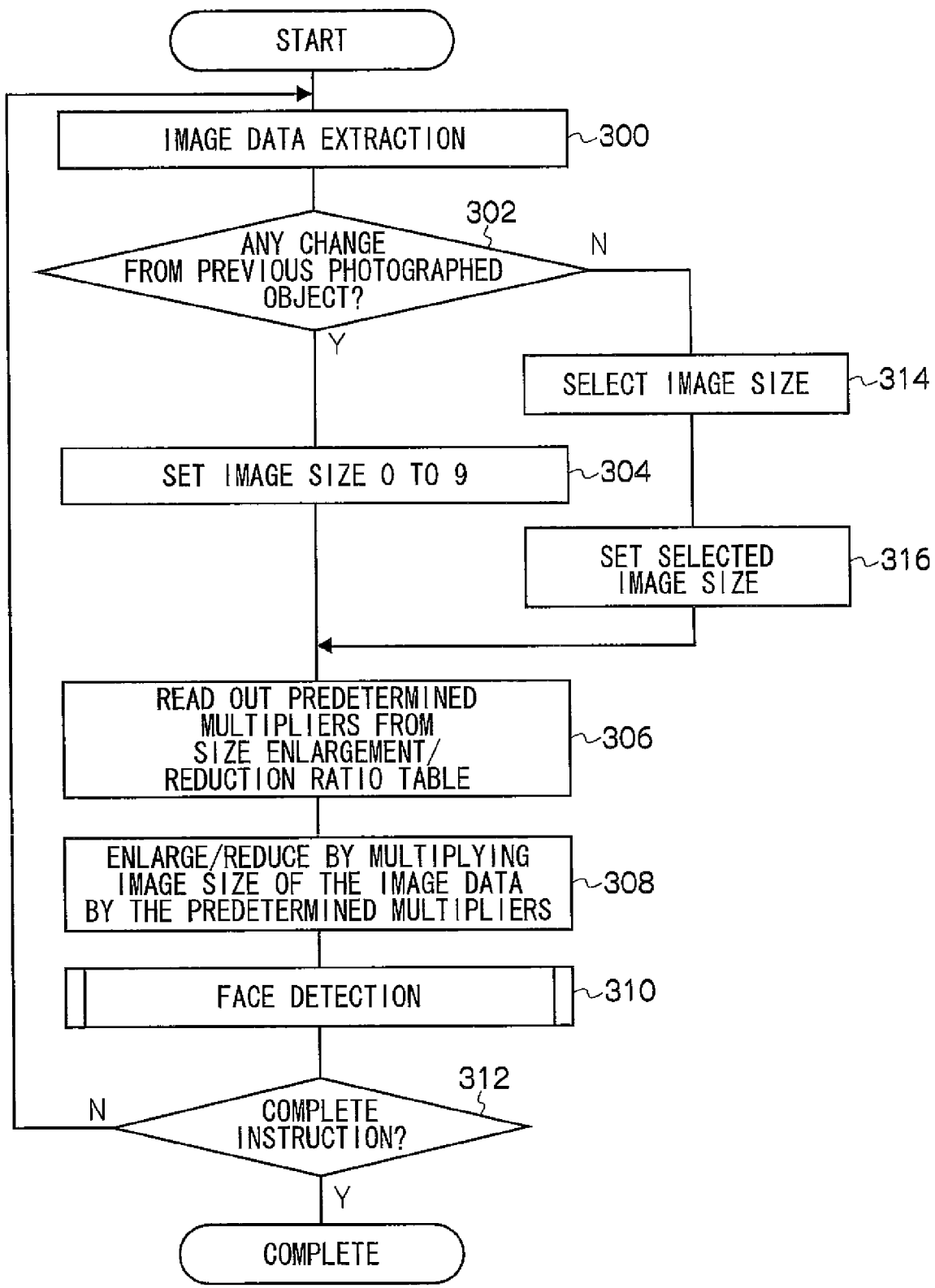
FIG. 4 is a flow chart for explaining processing in a face detection unit according to the first exemplary embodiment of the present invention.

Next, as shown in step 312 of FIG. 4, determination is made as to whether or not an instruction to end face detection processing for the through-image has been input, and when this is affirmative the program ends. However, when no such instruction has been input the routine then returns to step 300, and face detection processing is performed on the next frame of through-image data. It should be noted that the instruction to end face detection processing is input, for example, by a user pressing a specific button (for example the shutter button).

However, in step 314, when at step 302 the determination is that no instruction has been input, the image size levels for use in face detection processing for the next through-image are selected in the size selection section 60, based on the level(s) of the image size of the through-image(s) in which it had been determined that a face was present in the face detection the previous time.

In step 312, in the size selection section 60, image size levels for enlargement or reduction for the next through-image are selected of the image size(s) (four image sizes in the present embodiment) showing an evaluation value calculated in the face detection of step 310 of a threshold value or above and the image sizes neighboring to thereof. It should be noted that the image size 0 to 9 are selected as the image size levels in this step when there was no face detected in the through-image data the previous time. In the next step 316, the size identification data representing the image sizes selected in step 312 is set by the setting section 56.

A simplified explanation will now be given of a specific example of the processing of the face detection unit 40 shown in FIG. 3, as shown in the processing flow of FIGS. 6A to 6E.

First, the through-image extraction section 46 extracts through-image data, and FIG. 6A shows that image data is formed for the extracted through-image data for the specific image sizes 0 to 9 (full range of sizes) by image size enlargement processing and reduction processing thereof.

FIG. 6B shows a case in which the result of face detection using the image data formed for the specific image sizes 0 to 9 (the full range of sizes) and the template data is that a face is predicted to be present in the image sizes 5 and 6.

Next, FIG. 6C shows a case in which, in order to select the image sizes to be used in the next face detection, image sizes 4 to 7 are selected so as to include 4 image sizes adjacent to the image sizes 5 and 6 in which a face is predicted to be present.

Then, FIG. 6D shows a case where face detection processing is performed for the second frame of through-image using the image data and the template data for the selected image sizes 4 to 7, with the result that a face is predicted to be present in the image sizes 4 and 5. Next, FIG. 6E shows a case in which image data for image sizes 3 to 6 are selected as the amount of face detection carried out for the third frame of through-image, so as to include 4 image sizes including the images sizes adjacent on both sides of the image sizes 4 and 5 in which it is predicted there is a face present.

Modified Example

In the above first exemplary embodiment, the image size restriction width is fixed for the image sizes of in which a face has been detected in face detection, and control is carried out such that the selected image sizes are used in the next face detection.

However, when the face size of the photographic object is small relative to the image size of the image data, face detection is carried out from image data with enlarged image size.

Accordingly, there is a great influence on the processing speed of face detection due to the increase in the number of times of comparison of the portions of image data with the template data.

In contrast, when the face size of the photographic object is large relative to the image size of the image data faces are detected from image data of small image size.

Accordingly, there is no great influence on the processing speed of face detection generated, since the number of times of comparison of the portions of image data with the template data is reduced.

In recognition of this, in a modified example of the first exemplary embodiment, when face detection is performed using a large image size, control is made such that the number of levels of candidate image sizes used for face detection are relatively reduced, and processing speed of the face detection is controlled.

The configuration of a control system for a digital camera 1 according to the modified example of the first exemplary embodiment is similar to the configuration of the control system of the digital camera 1 according to the above first exemplary embodiment (see FIG. 1), and the same reference numerals are used and explanation thereof omitted.

Figure 7:
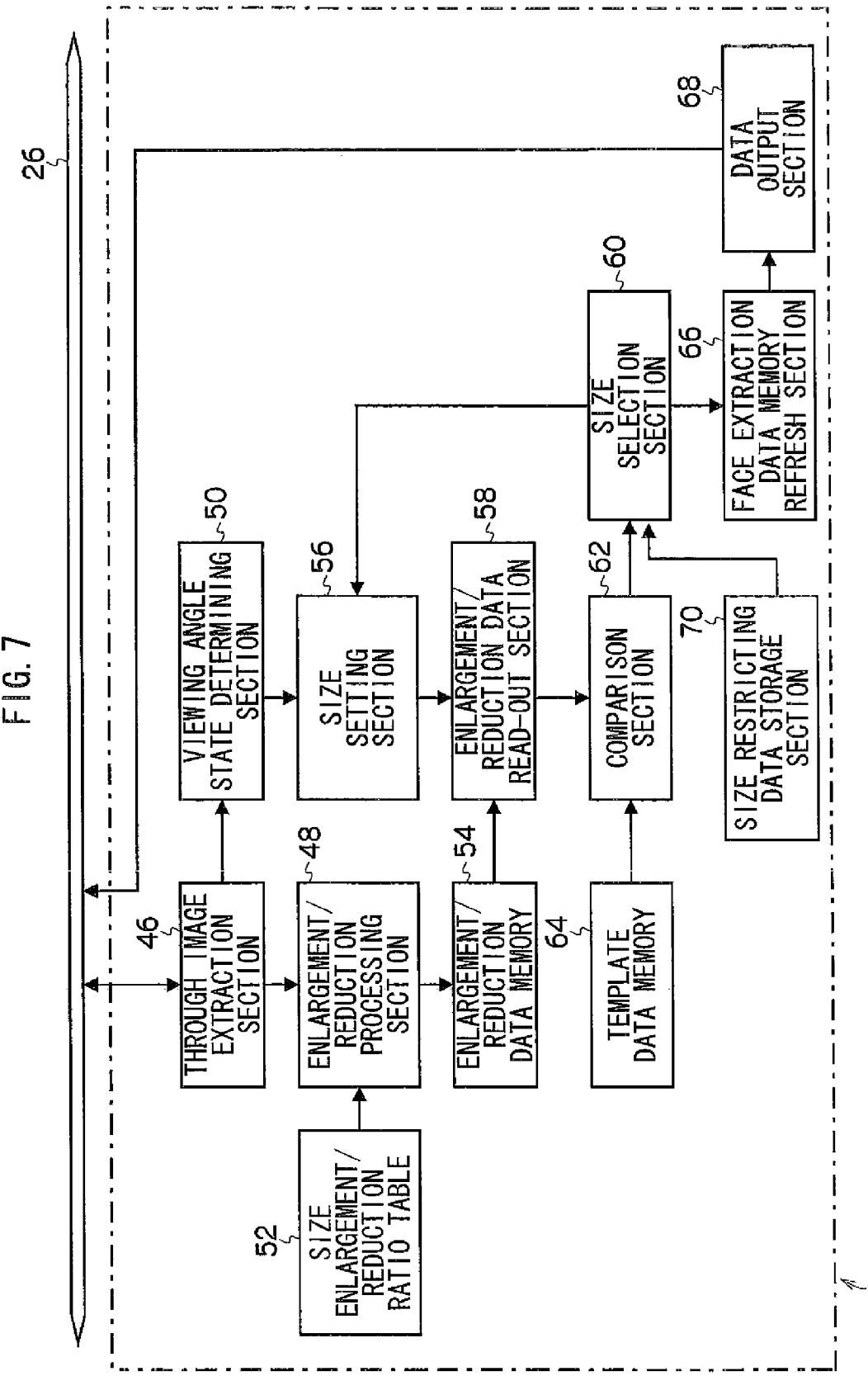
FIG. 7 is a block diagram showing a configuration of a face detection unit for performing face detection processing according to a modified example of the first exemplary embodiment of the present invention.

With regard to the configuration of the face detection unit 40 for executing face detection, explanation will be given with reference to FIG. 7, the same reference numerals are used for similar portions to those of the configuration of the face detection unit 40 explained in the first exemplary embodiment (see FIG. 2) and explanation thereof omitted. Only the differences from the first exemplary embodiment will be explained.

The portion of the face detection unit 40 which is different from that of the first exemplary embodiment is that there is a size restricting data storage section 70 provided for storing data to restrict the image size selection width used for face detection. The size restricting data storage section 70 is connected to the size selection section 60. The size selection section 60 reads out data stored in the size restricting data storage section 70 and performs selection of the image sizes for use in the next face detection.

Figures 8A, 8B:
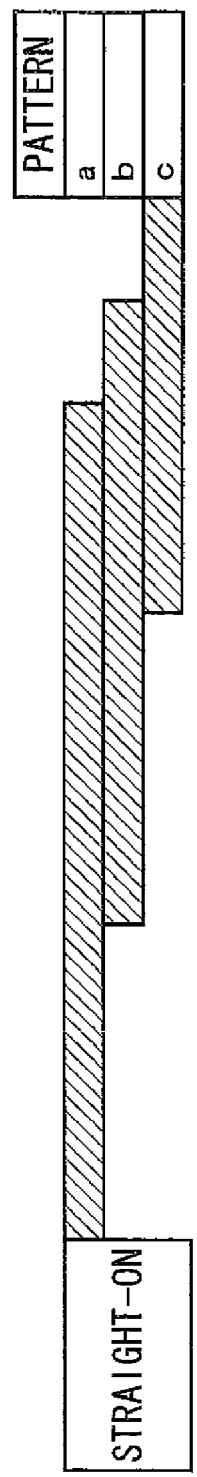
FIG. 8A is an explanatory diagram for explaining a method of restricting the image size selection width used for face detection, with FIG. 8A showing the image size levels and image data length.
FIG. 8B is an explanatory diagram for explaining a method of restricting the image size selection width used for face detection, with FIG. 8B showing a restriction width chart for restricting the image size selection width used for face detection.

FIG. 8A shows, in sequence from the smallest size, image size levels 0 to 9 shown with corresponding configured image data short side lengths, obtained by image size enlargement processing and reduction processing, divided by a predetermined number n. Further, FIG. 8A shows that large face sizes included in the image data are detected from smaller image sizes, and the smaller face sizes included in the image data are detected in larger image sizes.

FIG. 8B is an example of a restriction width chart for restricting the restriction width of the image sizes used in face detection. The restriction width charts is configured with different control widths corresponding to the image size levels shown in FIG. 8A, such as pattern a, pattern b, and pattern c. The widths for restricting the number of image size levels which correspond to these types of pattern are stored in the size restricting data storage section 70.

In this example of pattern setting, in FIG. 8B, pattern a sets the restriction width of the image size used in face detection to 0 to 7, pattern b sets the control with to 3 to 8, and pattern c sets the restriction width to 6 to 9.

Explanation will now be given of the basis for changing and setting the control widths for each of the patterns. As explained in the first exemplary embodiment, when the image size restriction width used in the next face detection is fixed, large differences emerge in the processing speed for face detection depending on the control width.

However, since face detection is carried out from small image sizes the larger the face size is in the photographic object, as described above, the number of times of comparison of the clipped portions of image data and template data may remain small. That is to say, no great influence on the face detection processing speed emerges. Accordingly, even if the restriction width is set wider as the face size in the photographic object increases, there is no great influence on the processing speed.

However, since face detection is from larger image sizes as the face size of the photographic object gets smaller, the number of comparisons of the clipped portions of image data and template data increases. Namely, there is a great influence on the face detection processing speed. Accordingly, the restriction width of small face size photographic objects is set narrow.

That is to say, when respective face detection is performed using the image sizes including the restriction width ranges of pattern a, pattern b and pattern c, it is possible to improve the face detection precision and control the processing speed by setting each of the control widths such that the processing times required for face detection are roughly equivalent, and the number of candidate levels is increased.

Data representing a pattern transition table, an example of which being shown in FIG. 9, is stored in the size restricting data storage section 70.

The pattern transition table shown in FIG. 9 is configured such that the pattern a, pattern b and pattern c can be set from the relationship between the largest image size of the image sizes in which a face is predicted to be present in the previous face detection, and the largest image size from the image sizes in which a face is predicted to be present in the current face detection, in order to specify the restriction width of the image size for use in the next face detection.

FIG. 9 also shows the conditions set for data representing the pattern type corresponding to the relationship between the largest image size of the image sizes in which a face is predicted to be present in the previous face detection, and the largest image size from the image sizes in which a face is predicted to be present in the current face detection.

Explanation will now be given of processing in the face detection unit 40 using the flow chart shown in FIG. 10, and similar steps therein to the flow chart of FIG. 3 are allocated the same reference numerals and explanation thereof will be omitted.

In step 500, when a face is detected by the face detection processing in step 310 the routine proceeds to step 502, and when there is no face detected then the routine proceeds to step 312 without executing the processing of step 502.

In step 502, data is selected representing the largest image size from the image size level(s) in which a face is predicted to be present by the face detection processing of step 310, and this data is temporarily stored in the size selection section 60.

Selection is made in step 314' of the image size levels to be used in face detection the next time.

In step 314' the size selection section 60 then, based on the data acquired in step 502 representing the largest image size, reads out the relevant pattern from the pattern transition table (see FIG. 9) showing the image size levels to be used for face detection with the next through-image data.

The size selection section 60 then reads out data representing the image size levels within the range in the restriction width chart shown in FIG. 8B corresponding to the read-out pattern.

The data representing the read-out image size level is output from the size selection section 60 to the size setting section 56. The size setting section 56 sets the size identification data with the data representing the image size output from the size selection section 60. Namely, by using the restriction width chart the restriction width of the image sizes to be used in the next face detection is controlled.

Second Exemplary Embodiment

Explanation will now be given of a second exemplary embodiment of the present invention.

Figure 11:
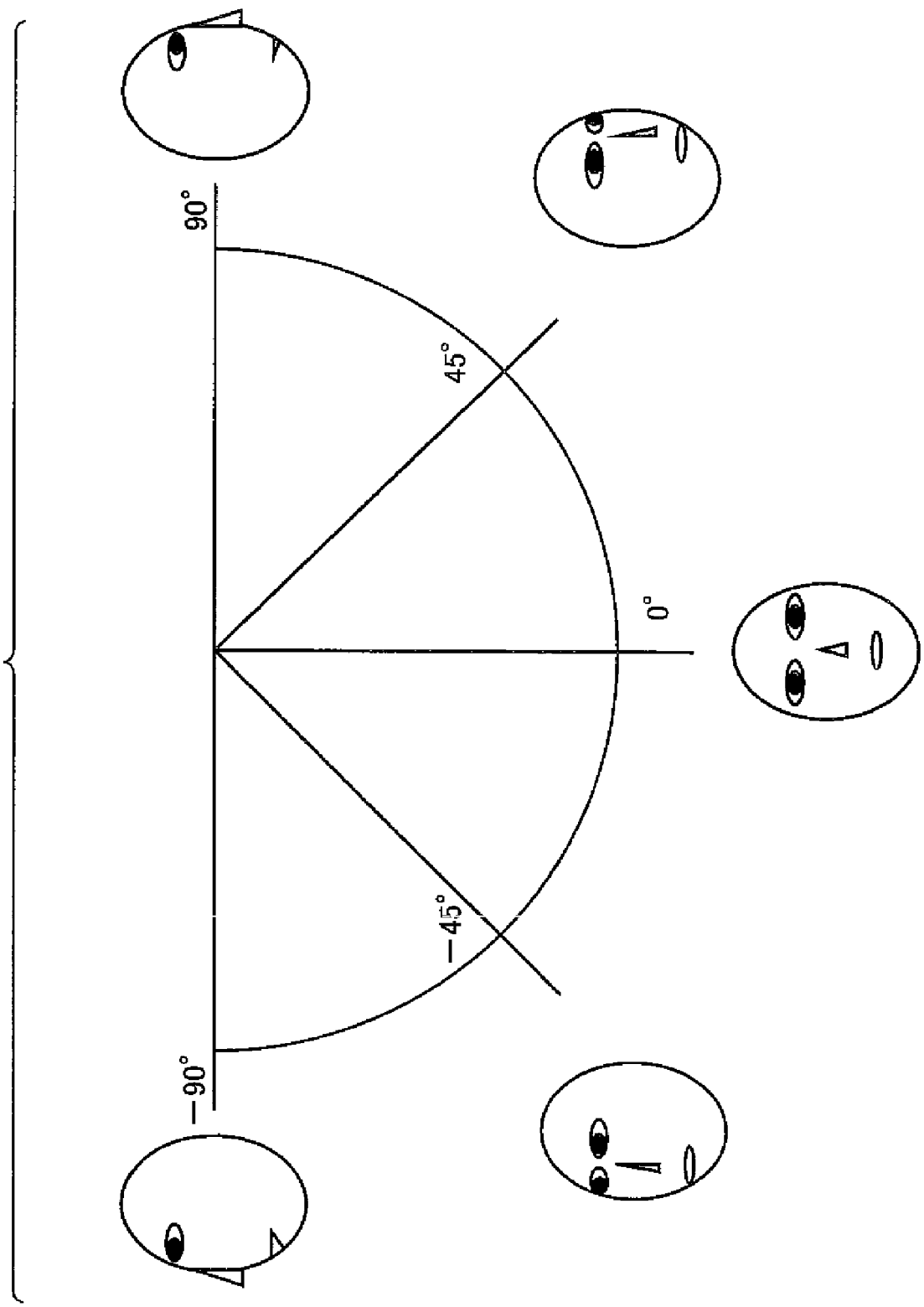
FIG. 11 is an explanatory diagram for explaining the existence of out-plane angle in a face of a photographic object.

In the first exemplary embodiment above, face detection was carried out by cross-checking a photographic object against templates, however, for example, the face of a photographic object is at various angles, with straight-on being 0°, and facing left being a positive angle, as shown in FIG. 11. In the second exemplary embodiment, templates representing the left-right facing of the face (out-plane angle) are formed in advance, for carrying out the face detection.

The number of times cross-checking is carried out increases, however, if face detection processing is further carried out using templates representing the facing direction of side-faces, faces at an angle, and the like, and the processing time increases.

In order to address this issue, the second exemplary embodiment executes face detection using templates representing the facing direction of side-faces, faces at an angle, and the like and also controls such that the number of times cross-checking of a photographic object with templates is carried out is reduced, and an increase in processing time is avoided.

Since the configuration of the control system of a digital camera 1 according to the second exemplary embodiment is similar to the control system of the digital camera 1 according to the first exemplary embodiment (see FIG. 1), the same reference numerals will be used and explanation thereof will be omitted.

Figure 12:
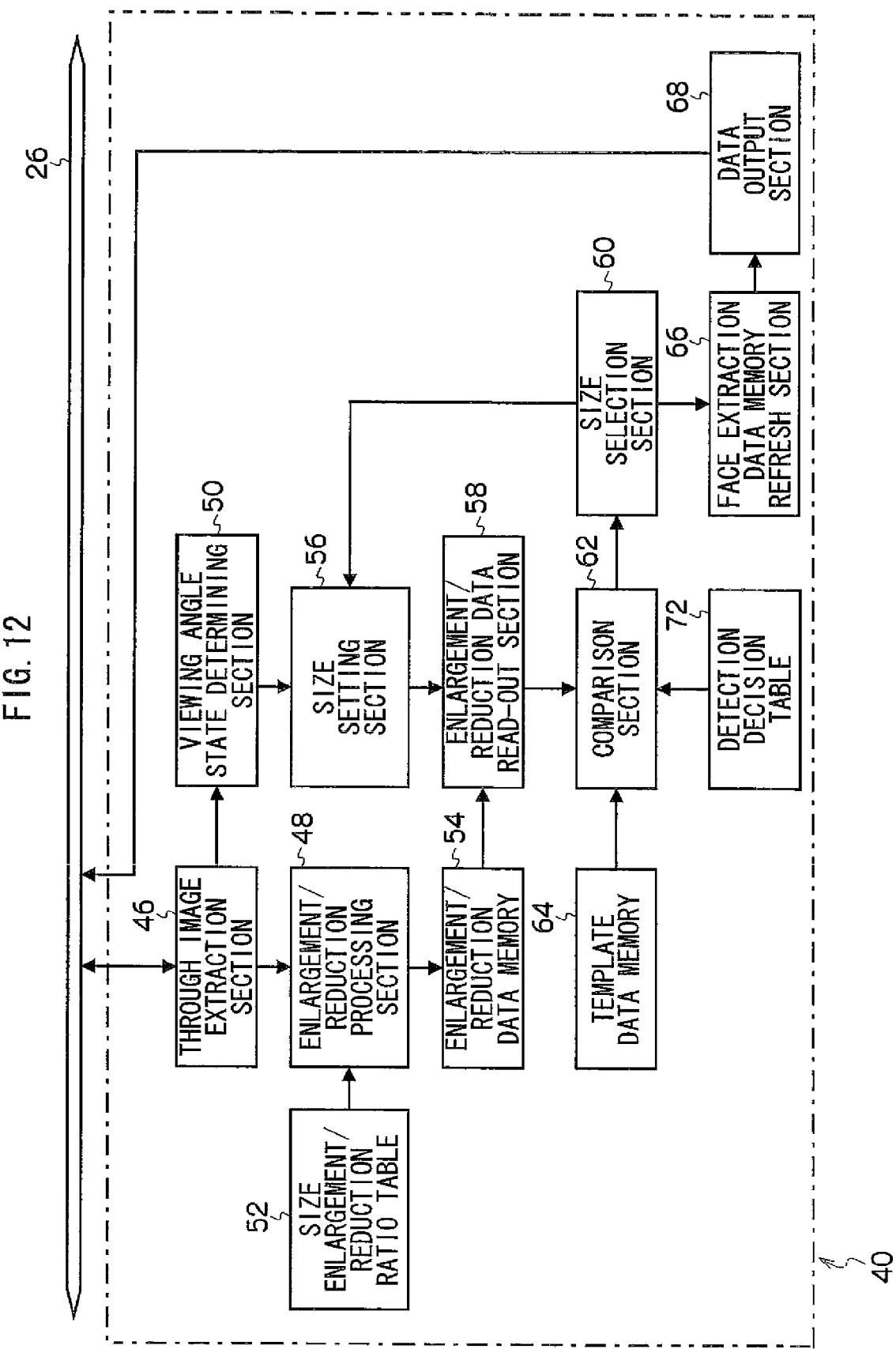
FIG. 12 is block diagram showing a configuration of a face detection unit for performing face detection processing according to a second exemplary embodiment of the present invention.

Moreover, FIG. 12 is used for explanation regarding the configuration of the face detection unit 40 for executing face detection, however, the same reference numerals are used for parts of the configuration similar to those of the face detection unit 40 explained in the first exemplary embodiment above (see FIG. 2) and explanation thereof is omitted. Only the portions that differ therefrom will be explained.

The difference from the face detection unit 40 of the first exemplary embodiment is that a detection decision table 72 is provided, for storing data to determine whether or not to execute face detection according to out-plane angle. It should be noted that straight-on is designated as 0°, and facing directions to the left are designated with positive angles.

The detection decision table 72 is connected to the comparison section 62. The comparison section 62 reads out the data stored in the detection decision table 72, and determines whether or not to execute face detection. When it is determined that face detection is to be executed, the comparison section 62 compares the image data with the templates.

The detection decision table 72 is set with, for example, detection decision information representing whether or not to execute face detection for image size levels 0 to 9 (Y represents that face detection is to be carried out, N represents that face detection is not to be carried out), as shown in Table 1 below.

It should be noted that the out-plane angles shown in Table 1 are only one example thereof, and different angles to those of Table 1 may be used as the out-plane angles.

TABLE 1

| Out-plane Angle | Image Size | | | | | | | | | |
|---|---|---|---|---|---|---|---|---|---|---|
| | 0 | 1 | 2 | 3 | 4 | 5 | 6 | 7 | 8 | 9 |
| −90° | Y | Y | Y | Y | Y | Y | N | N | N | N |
| −45° | Y | Y | Y | Y | Y | Y | Y | Y | N | N |
| 0° | Y | Y | Y | Y | Y | Y | Y | Y | Y | Y |
| 45° | Y | Y | Y | Y | Y | Y | Y | Y | N | N |
| 90° | Y | Y | Y | Y | Y | Y | N | N | N | N |

NB.
Y = execute face detection,
N = do not execute face detection

Since generally in a photographic object the number of times a small, completely side-on face is photographed is less than those of a straight-on face or angled face, the number of types of out-plane angle subject to face detection processing is set to be small for large image sizes 6 to 9, as shown in Table 1 above. Namely, as the image size of the classified images increases, the number of types of out-plane angle subject to face detection processing is set smaller.

Figure 13:
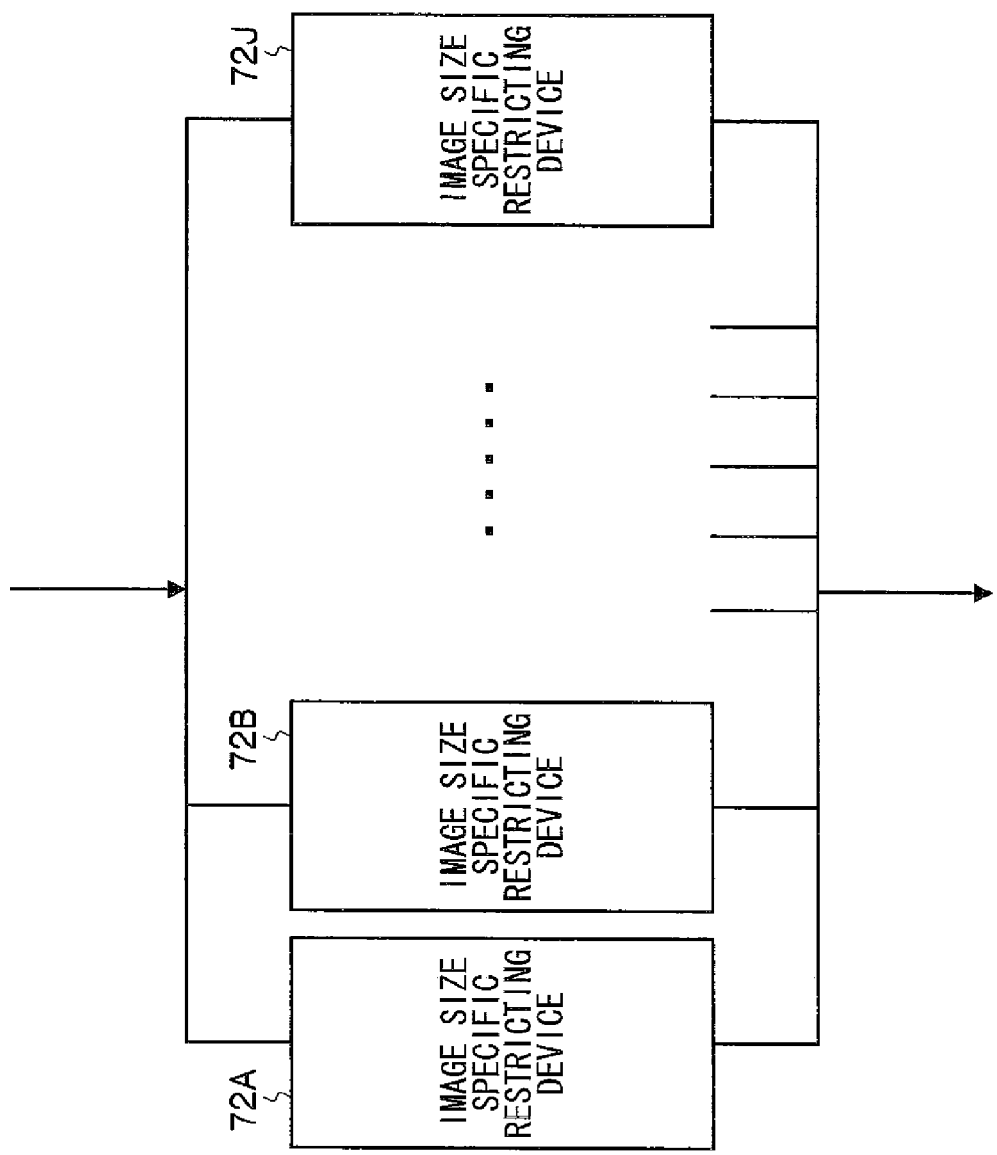
FIG. 13 is block diagram showing image size specific restricting devices for controlling whether or not to execute face detection processing according to a second exemplary embodiment of the present invention.

FIG. 13 shows image size specific restricting devices 72A to 72J for controlling whether or not face detection is executed according to the out-plane angle (image size specific restricting devices 72C to 72I are omitted in FIG. 13), and one of the comparison sections 62 is provided specific to each image size for face detection.

The comparison sections 62 are input through the enlargement/reduction data read-out section 58 with size identification data set in the size setting section 56, and execute face detection in whichever of the image size specific restricting devices 72A to 72J corresponds to the input image size(s).

Figure 14:
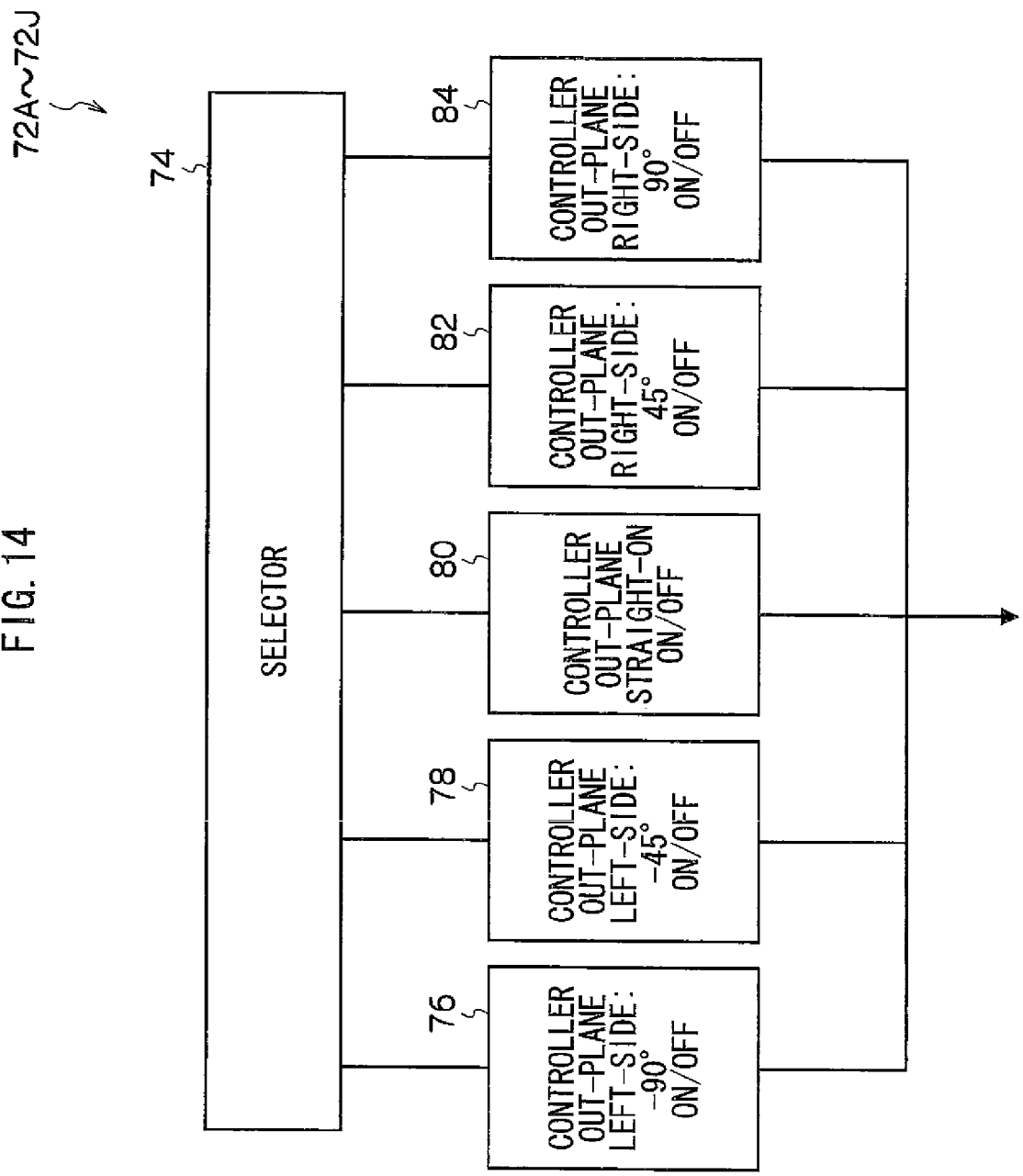
FIG. 14 is a flow chart showing a configuration of image size specific restricting devices according to the second exemplary embodiment of the present invention.

The image size specific restricting devices 72A to 72J, as shown in FIG. 14, are each configured including a selector 74 and controllers 76 to 84.

The selector 74 is connected to each of the controllers 76 to 84, provided corresponding to each out-plane angle. The selector 74 selects the out-plane angle for face detection execution. Data representing whether or not to execute face detection is output to the controllers 76 to 84 after selection.

The controller 76 sets data for whether or not to execute face detection for an out-plane angle of −90° (side-on facing left), based on the output data from the selector 74. When face detection is to be executed the data is set ON, and when not to be executed the data is set OFF. The other controllers also execute similar processing, with the controller 78 corresponding to an out-plane angle of −45°, the controller 80 corresponding to an out-plane angle of 0°, the controller 82 corresponding to an out-plane angle of 45°, and the controller 84 corresponding to an out-plane angle of 90°.

Moreover, as well as the templates representing a straight-on face, templates representing faces having out-plane angles of −90°, −45°, 45° and 90° are also stored in advance in the template data memory 64.

Figure 15:
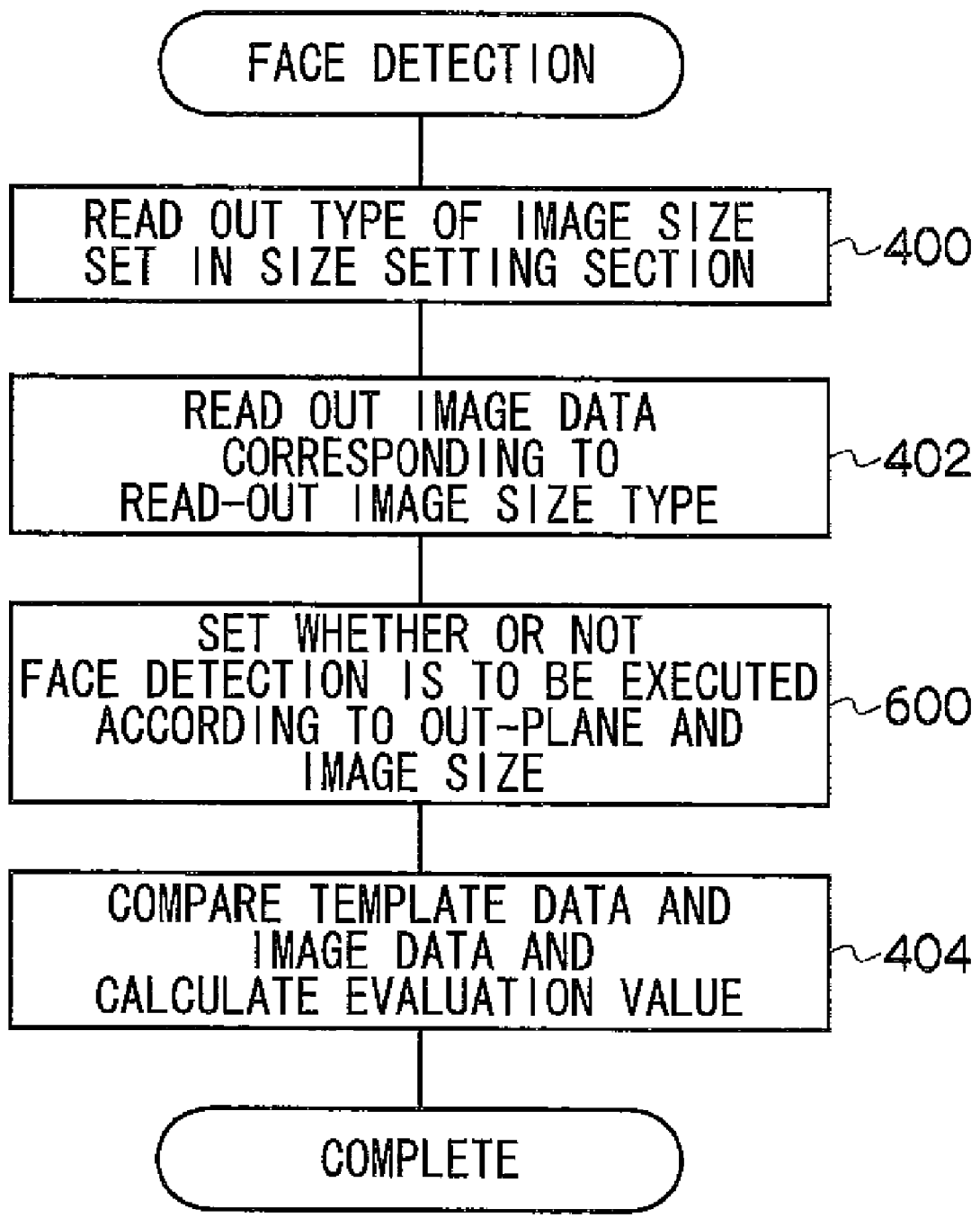
FIG. 15 is a flow chart for explaining details of face detection processing according to the second exemplary embodiment of the present invention.

Explanation will be given of face detection in the digital camera 1 according to the second exemplary embodiment using the flow chart shown in FIG. 15, and explanation will be given using the same reference numerals for the processing steps that are similar to those of the flow chart shown in FIG. 4 relating to face detection of the first exemplary embodiment.

First, in step 400, the enlargement/reduction data read-out section 58 reads out size identification data for use in face detection that was set in the size setting section 56. Next, in step 402, the image data is read out from the enlargement/reduction data memory 54 of the corresponding image size(s) to the size identification data read-out in step 400.

Next, in step 600, the comparison section 62 reads-out the data from the detection decision table 72 relating to the image size and out-plane angle for use in face detection, based on the size identification data read out in step 400.

As an example of step 600, when the size identification data is set in the size setting section 56 representing the image sizes 5 and 6, the comparison section 62 executes face detection in the image size specific restricting device 72F (not shown in the figures) and the image size specific restricting device 72G (not shown in the figures) that correspond to this size identification data.

In the image size specific restricting device 72F, the selector 74 reads out the detection decision information corresponding to the image size 5 from the detection decision table 72. Since the detection decision information represents carrying out face detection for all of the out-plane angles 90°, 45°, 0°, 45° and 90°, as shown in Table 1, each of the controllers 76 to 84 is set ON.

Moreover, in the image size specific restricting device 72G, the selector 74 reads out the detection decision information corresponding to the image size 6 from the detection decision table 72. Since the detection decision information represents carrying out face detection for the out-plane angles −45°, 0°, and 45°, as shown in Table 1, the controllers 76 and 84 are set OFF.

Next, in step 404, the comparison section 62 reads out the template from the template data memory 64. Comparison is then made between the read-out template data and the image data read out from the enlargement/reduction data read-out section 58.

The comparison method of the image data and the template data is, as described above, by calculation of an evaluation value representing the relationship between the brightness value of the clipped image data with the brightness value of the template data, using the templates corresponding to the out-plane angles set ON at step 600 in the controllers 76 to 84.

Figure 10:
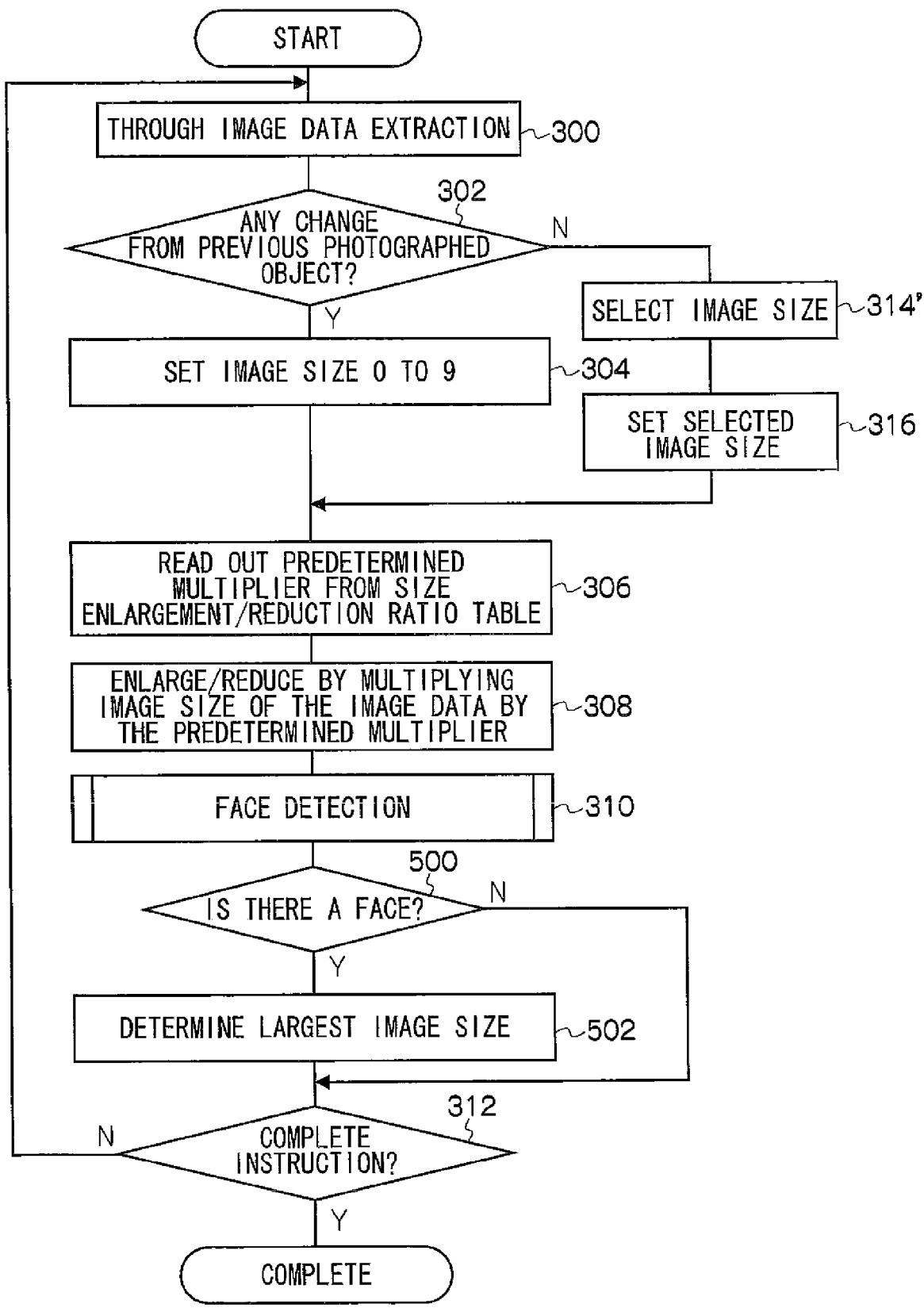
FIG. 10 is a flow chart for explaining processing in a face detection unit according to the first exemplary embodiment of the present invention.

It should be noted that the face detection of the third exemplary embodiment may be used in the processing of step 310 shown in FIG. 4 and FIG. 10, of the first exemplary embodiment and the modified example of the first exemplary embodiment.

Third Exemplary Embodiment

Explanation will now be given of the third exemplary embodiment of the present invention.

Figure 16:
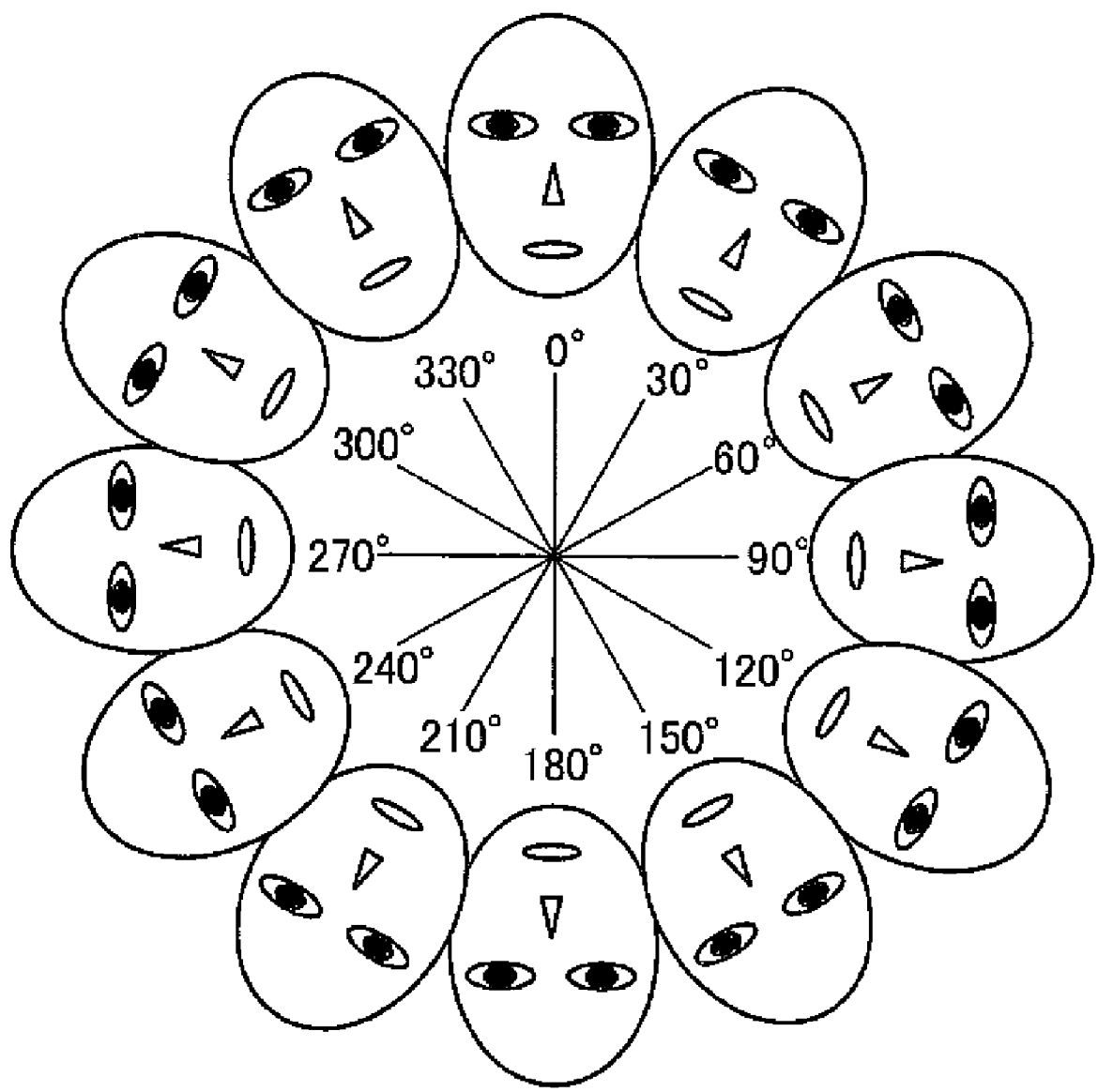
FIG. 16 is an explanatory diagram for explaining the existence of in-plane angle in a photographic object face.

In the second exemplary embodiment, face detection was executed considering the direction of facing of a face, such as a side-on face or angled face, however, if a photographer photographs when a digital camera 1 is rotated about its optical axis, or an axis parallel thereto, as the center, then a face in the photographic object has various angles, with the upright direction as 0° and rotation therefrom in the clockwise direction as positive angles, as shown in FIG. 16.

In such a case, if further templates are formed for faces with rotation angles (in-plane angles) with the upright direction as 0° and rotation therefrom in the clockwise direction as positive angles, the number of times comparison is carried out between the through-image data and templates increases, and the processing time also increases.

In order to address this issue, an objective of the third exemplary embodiment is to execute face detection using templates representing faces rotated in the clockwise direction with the upright direction as 0°, and to also control such that the number of times cross-checking is carried out of the through-image data against the templates is reduced, and an increase in the processing time is avoided.

Figure 17:
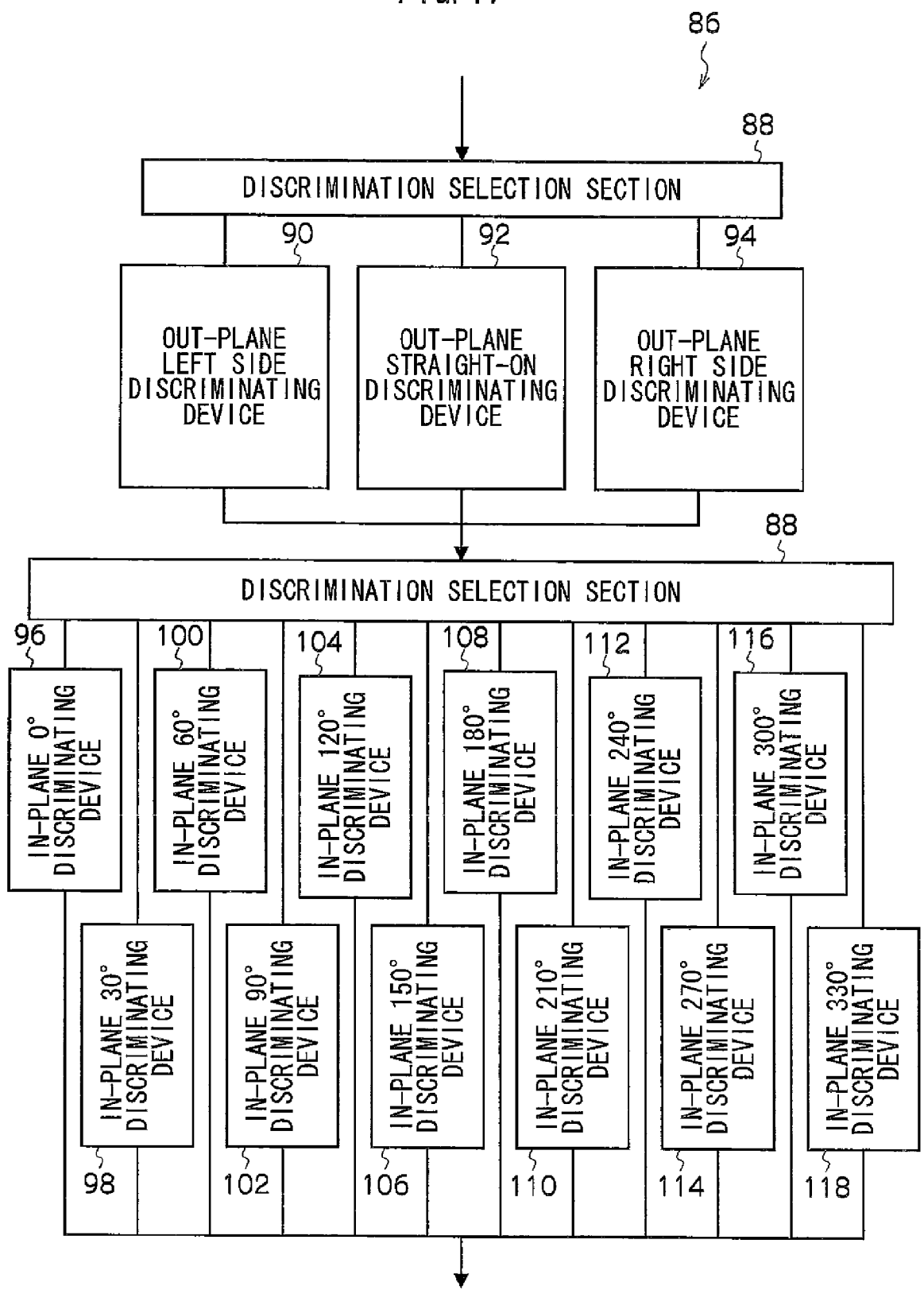
FIG. 17 is a block diagram showing a discriminating device group 86 for comparing image data and templates according to a third exemplary embodiment of the present invention.
Figure 18:
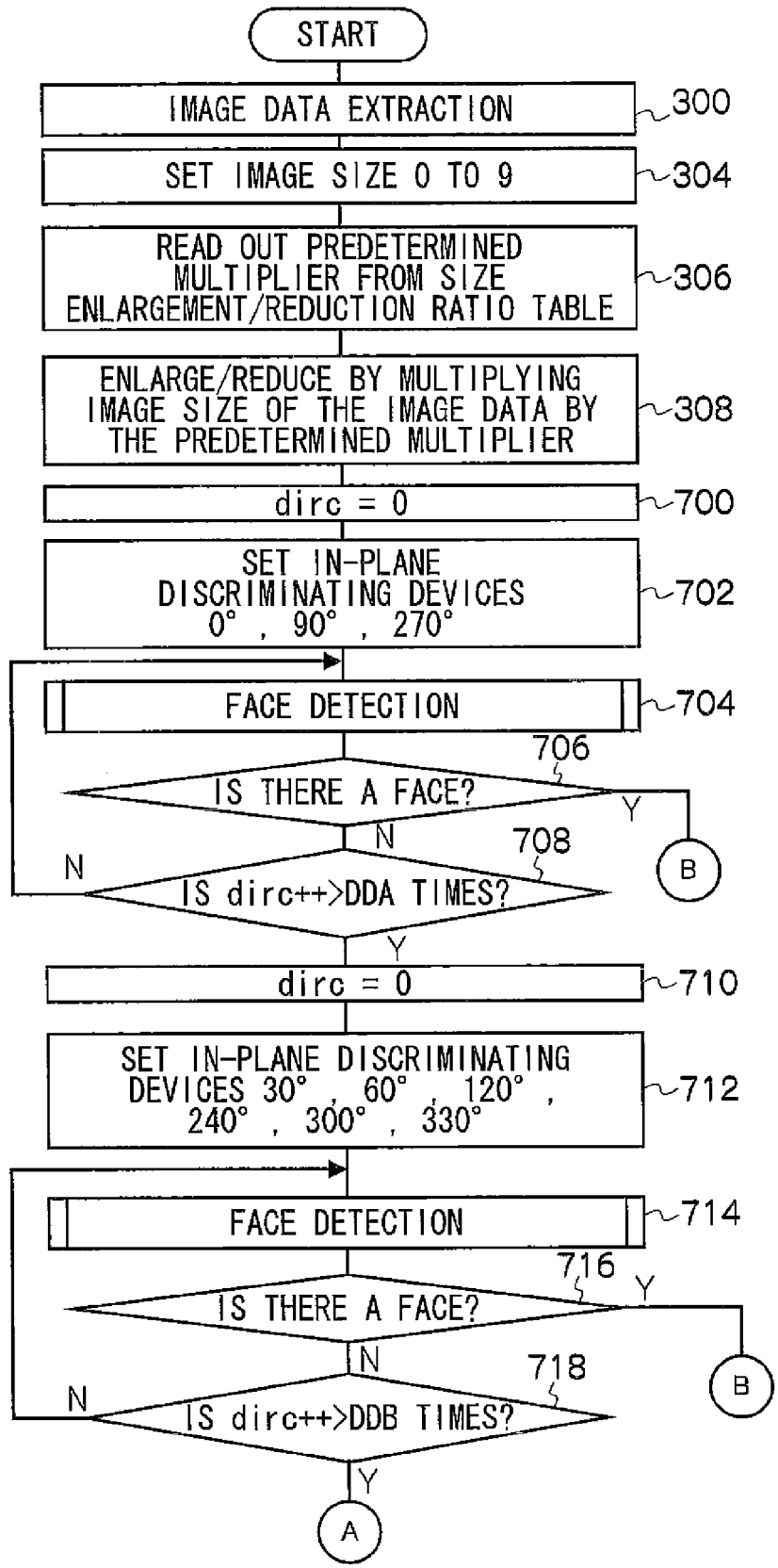
FIG. 18 is a flow chart for explaining processing in a face detection unit according to a third exemplary embodiment of the present invention.

Since the configuration of a control system for a digital camera 1 according to the third exemplary embodiment is similar to the configuration of the control system of the digital camera 1 according to the above first exemplary embodiment (see FIG. 1 and FIG. 2), the same reference numerals are used and explanation thereof omitted FIG. 17 shows a discriminating device group 86 for carrying out comparison of in-plane discriminating devices and template data, and the discriminating device group 86 is provided to the comparison section 62. The discriminating device group 86 is configured including: a discrimination selection section 88; an out-plane (left side) discriminating device 90, an out-plane (straight-on) discriminating device 92, and an out-plane (right side) discriminating device 94 (collectively referred to below as out-plane discriminating devices); and an in-plane (0°) discriminating device 96, an in-plane (30°) discriminating device 98, and so on up to an in-plane (330°) discriminating device 118 (collectively referred to below as in-plane discriminating devices).

The discrimination selection section 88 is connected to the out-plane discriminating devices and to the in-plane discriminating devices. The discrimination selection section 88 relates the face detection to the target out-plane angle and in-plane angles and selects the corresponding out-plane discriminating devices and the in-plane discriminating devices. Then, image data is output to the selected out-plane discriminating devices and in-plane discriminating devices.

The out-plane (left side) discriminating device 90 carries out a comparison of image data output from the discrimination selection section 88 with template data for an out-plane angle of 270° (left side facing) read out from the template data memory 64. In the same manner, the out-plane (straight-on) discriminating device 92 carries out comparison using template data for an out-plane angle of 0° (facing straight-on), and the out-plane (right side) discriminating device 94 carries out comparison using template data for an out-plane angle of 90° (right side facing).

Template data representing faces having in-plane angles and out-plane angles are stored in the template data memory 64. In the digital camera 1 according to the third exemplary embodiment the template data is formed by rotations of intervals of 30° in the clockwise direction from the upright direction 0° on template data representing each of the faces of out-plane angles of straight-on, right side and left side, however, there is no limitation thereto and other angles may be used as the out-plane angles and in-plane angles.

The in-plane (0°) discriminating device 96 carries out comparison of the image data output from the discrimination selection section 88 with the template data representing a face at in-plane angle of 0° read out from the template data memory 64. In the same manner, the in-plane (30°) discriminating device 98 to the in-plane (330°) discriminating device 118 use template data representing faces of the corresponding in-plane angles for carrying out the comparisons.

Next, explanation will be given of the processing in the face detection unit 40, using the flow charts shown in FIGS. 18 to 21, and similar steps to those of the flow chart of FIG. 4 are allocated the same reference numerals and explanation thereof is omitted. It should be noted that the flow charts shown in FIGS. 18 to 21 show face detection processing carried out for one frame of through-image, and the processing for setting, based on this result, the in-plane angles subject to detection in the face detection processing for the next through-image.

First, in step 700, a counter (dire) for counting the number of times face detection is executed is reset. In the next step 702, the in-plane (0°) discriminating device 96, the in-plane (90°) discriminating device 102 and the in-plane (270°) discriminating device 114 are selected in the discrimination selection section 88 for carrying out face detection at in-plane angles of 0°, 90°, and 270°.

The basis for carrying out face detection at in-plane angles of 0°, 90°, and 270° is that, when a photographer photographs by rotation the digital camera 1 about its optical axis, or an axis parallel thereto, there are often occasions of a face in the photographic object being 0°, 90°, and 270°, with the upright direction as 0° and the clockwise direction as positive rotations.

Next, in step 704, face detection is carried out using image data formed in the specific image sizes 0 to 9 of the size identification data showing the image size levels set in the size setting section 56 at step 304, using the in-plane (0°) discriminating device 96, the in-plane (90°) discriminating device 102 and the in-plane (270°) discriminating device 114 selected at step 502.

Explanation will now be given of details of the processing of this step 704 using the flow chart show in FIG. 20, and steps of the processing that are similar to the processing shown in the flow charts of FIGS. 5 and 15, relating to the face detection explained in the first exemplary embodiment, the modified example of the first exemplary embodiment and the second exemplary embodiment, are allocated the same reference numbers and explanation thereof is omitted.

First, in step 400, the enlargement/reduction data read-out section 58 reads out the size identification data representing the image sizes 0 to 9 set in the size setting section 56 for use in face detection.

In the next step 402, the enlargement/reduction data read-out section 58 reads out from the enlargement/reduction data memory 54 the image data corresponding to the size identification data read out in step 400.

Next, in step 738, comparison is carried out of the image data and the template data using the in-plane (0°) discriminating device 96, in-plane (90°) discriminating device 102 and in-plane (270°) discriminating device 114 that were selected in step 702.

To carry out the comparison of image data with template data, the in-plane (0°) discriminating device 96 reads out the template data of in-plane angle 0° from the out-plane (right side) discriminating device 94. Next, comparison with the template data of in-plane angle 0° is carried out by each image size for image sizes 0 to 9 that have been read out by the enlargement/reduction data read-out section 58 in step 402.

In a similar manner, the in-plane (90°) discriminating device 102 carries out comparison using template data of in-plane angle 90°, and the in-plane (270°) discriminating device 114 carries out comparison using template data of in-plane angle 270°.

The comparison method of the image data and the template data is, as described above, by calculation of an evaluation value representing the relationship between the brightness value of the image data with the brightness value of the template data.

Figure 21:
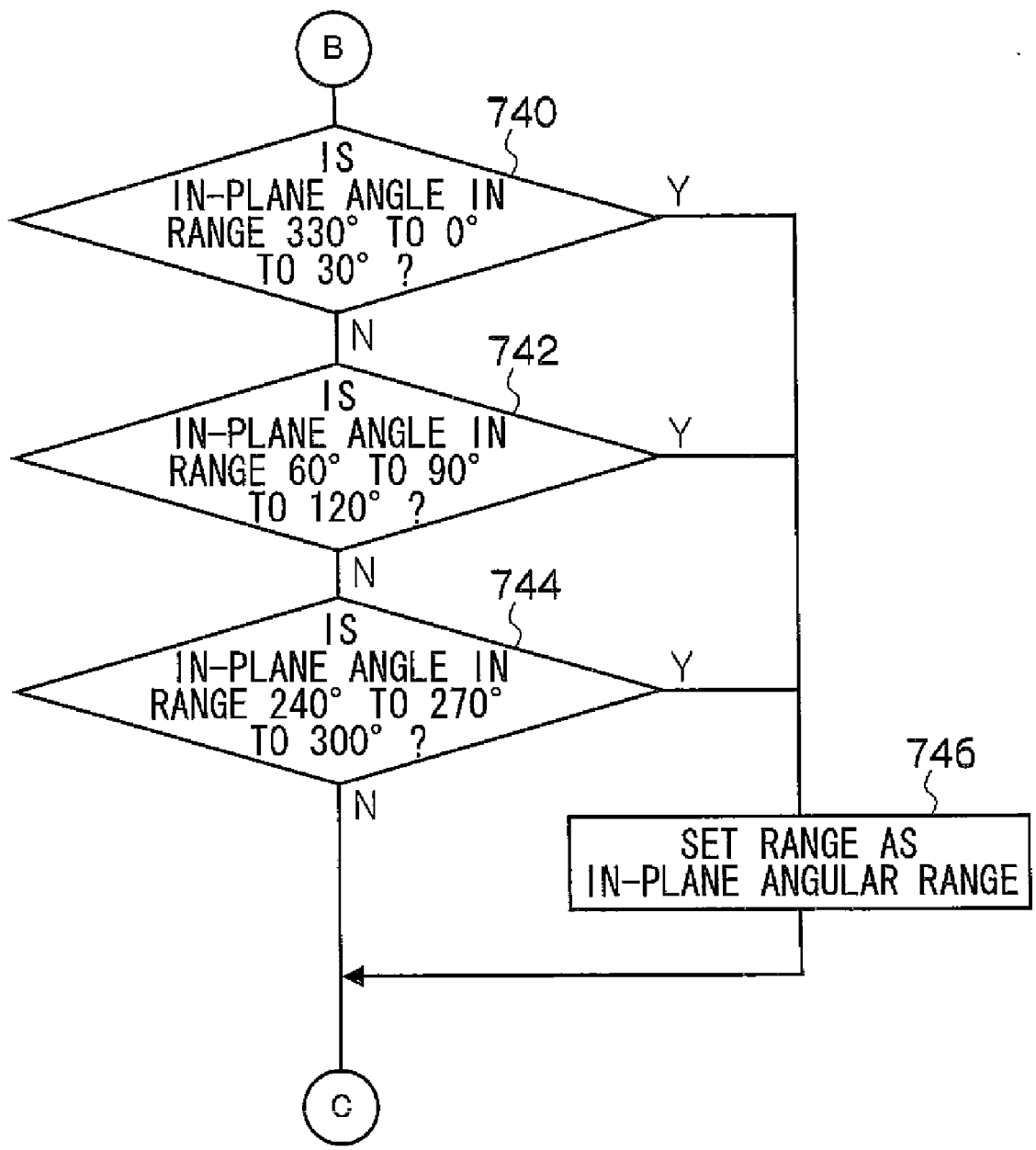
FIG. 21 is a flow chart for explaining processing in a face detection unit according to the third exemplary embodiment of the present invention.

Next, in step 706, if an image size is detected in which a face is predicted to be present from the image data formed of image sizes 0 to 9 then the routine proceeds to step 740 (see FIG. 21). Namely, at step 738, when the result of carrying out face detection in the comparison section 62, the calculated evaluation value, has detected an image size showing a predetermined threshold value or greater, the routine proceeds to step 740. When no such image size is detected then the routine proceeds to step 708.

In step 708, the counter (dire) showing the number of times of face detection execution is incremented, and when the count becomes a predetermined number of times (DDA shows a predetermined number set in advance) or greater, is it is determined that there is no face present for the in-plane angles of 0°, 90° or 270°, and the routine then proceeds to step 710. If the counter (dirc) is less than the predetermined number of times then the routine returns to step 704. It should be noted that dirc ++ shown in step 708 refers to the incremented dirc. dirc ++ will be used with the same meaning below.

In step 710, the counter (dire) for counting the number of times of face detection execution is reset. Next, in step 712, the in-plane in-plane angles are set so as to widen the range of in-plane angles for carrying out face detection. The in-plane angles are set by the discrimination selection section 88 selecting the in-plane discriminating devices corresponding to the in-plane angles to be subject to face detection. In the exemplary embodiment the in-plane angles are set in this step to in-plane angles of 30°, 60°, 120°, 240°, 300° and 330°, however, there is obviously no limitation thereto.

In step 714, similar processing is carried out as that in step 704 and so explanation thereof will be omitted.

Next, in step 716, similar processing is carried out as that in step 706 and so explanation thereof will be omitted, and when an image size is detected showing an evaluation value calculated in the comparison section 62 of a predetermined threshold value or above, the routine proceeds to step 740, and when no such image size is detected the routine proceeds to step 718.

Figure 19:
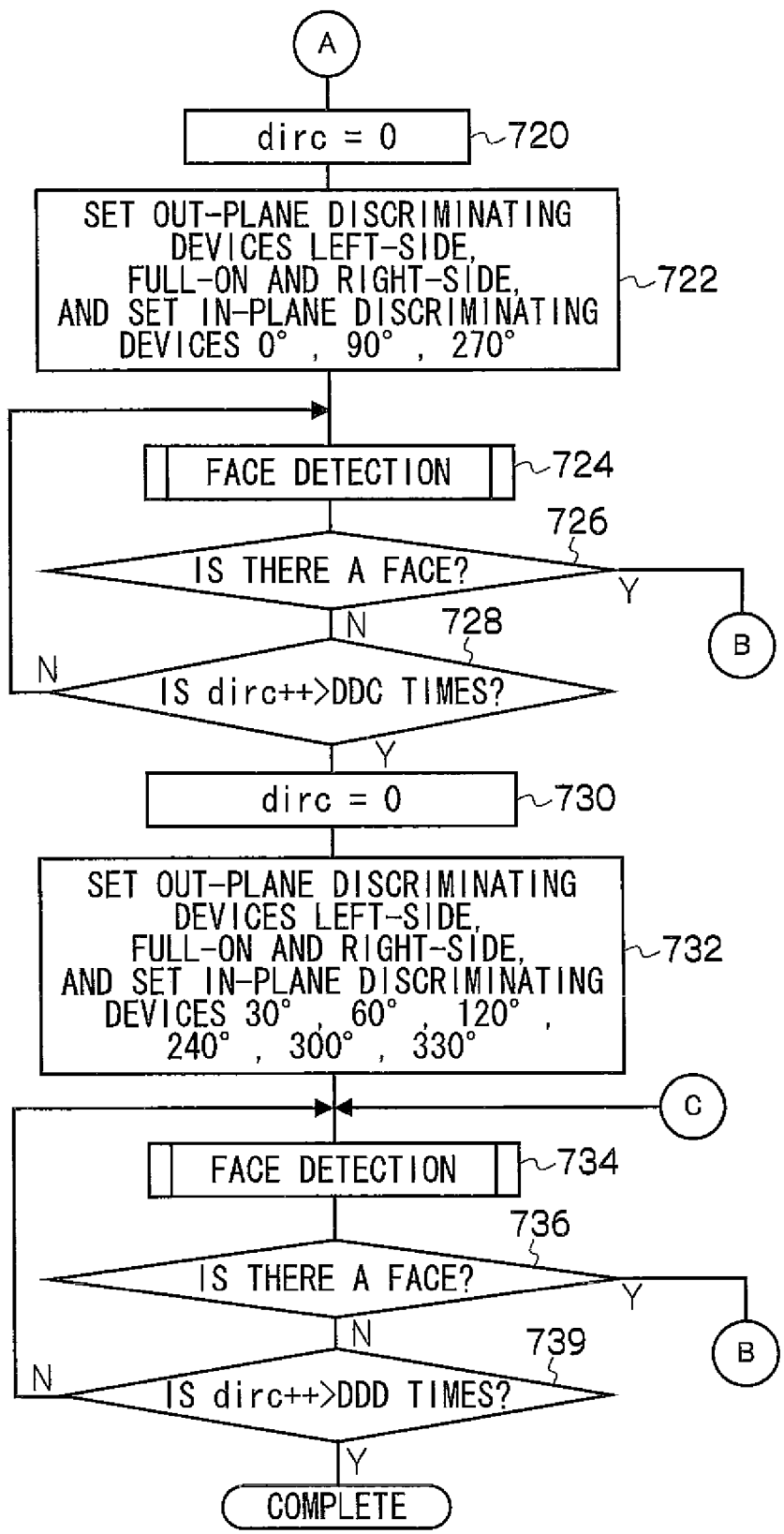
FIG. 19 is a flow chart for explaining processing in a face detection unit according to the third exemplary embodiment of the present invention.

In step 718, similar to in step 708, the counter (dirc) showing the number of times of face detection execution is incremented, when the count is over a predetermined number of times (DDB shows a predetermined number set in advance), then the routine proceeds to step 720 (see FIG. 19). Namely, the determination at step 718 is affirmative when no face has been detected by the in-plane discriminating device selected in step 712.

However, if the counter (dirc) is less than the predetermined number of times then the routine returns to step 714.

Next, in step 720, the counter (dirc) for counting the number of times of face detection execution is reset. Then, in step 722, the out-plane (left side) discriminating device 90, the out-plane (straight-on) discriminating device 92, the out-plane (right side) discriminating device 94, the in-plane (0°) discriminating device 96, the in-plane (90°) discriminating device 102 and the in-plane (270°) discriminating device 114 are selected the in the discriminating device group 86, so that face detection is carried out the out for the out-plane angles left-side, straight-on, right-side, and the in-plane angles of 0°, 90°, and 270°.

Next, the in step 724, face detection is carried the out using the out-plane (left side) discriminating device 90, the out-plane (straight-on) discriminating device 92, the out-plane (right side) discriminating device 94, the in-plane (0°) discriminating device 96, the in-plane (90°) discriminating device 102, and the in-plane (270°) discriminating device 114 selected in step 718, for the image data formed for the size identification data set in the size setting section 56 at step 304, namely for the image data for the specific image sizes of 0 to 9.

Explanation will now be given of details of the processing in this step 724, with reference to the flow chart shown in FIG. 20.

First, in step 400, the enlargement/reduction data read-out section 58 reads out the size identification data representing the image sizes 0 to 9 set in the size setting section 56 for use for face detection.

Next, in step 402, the enlargement/reduction data read-out section 58 reads out from the enlargement/reduction data memory 54 the image data corresponding to the size identification data read out in step 400.

Next, in step 738, comparison is carried out of the image data with the template data using the out-plane (left side) discriminating device 90, the out-plane (straight-on) discriminating device 92, the out-plane (right side) discriminating device 94, the in-plane (0°) discriminating device 96, the in-plane (90°) discriminating device 102 and the in-plane (270°) discriminating device 114 that were selected in step 722.

In the comparison of this step 738, first the out-plane (left side) discriminating device 90 reads out the template data for left-side facing from the template data memory 64. Then the image data of the image sizes 0 to 9 that have been read out by the enlargement/reduction data read-out section 58 in step 402 are compared, by each size, with the left-side facing template data.

In a similar manner, the out-plane (straight-on) discriminating device 92 carries out comparison using the straight-on facing template data, and the out-plane (right side) discriminating device 94 carries out comparison using the right-side facing template data.

When the processing in the out-plane discriminating devices is completed, the in-plane (0°) discriminating device 96 reads out the template data of in-plane angle 0° and out-plane angle left-side facing, straight-on facing, and right-side facing, from the template data memory 64. Next, in step 402, the image data of the image sizes 0 to 9 that have been read out by the enlargement/reduction data read-out section 58 in step 402 are compared, by each size, with the read-out template data.

In a similar manner, the in-plane (90°) discriminating device 102 carries out comparison using the template data with an in-plane angle of 90° and with out-plane angles of left-side facing, straight-on facing, and right-side facing, and the in-plane (270°) discriminating device 114 carries out comparison using the template data with an in-plane angle of 270° and with out-plane angles of left-side facing, straight-on facing, and right-side facing.

The comparison method of the clipped image data and the template data is, as described above, by calculation of an evaluation value representing the relationship between the brightness value of the image data with the brightness value of the template data.

Next, in step 726, similar processing is carried out as that in step 706 and 716 and so explanation thereof will be omitted, and if an evaluation value calculated by the comparison section 62 shows a value of the predetermined threshold value or greater, when a face has been detected to be present in an image size, the routine proceeds to step 740. However, if no face is detected to be present in the image size then the routine proceeds to step 728.

Next, in step 728, the counter (dire) showing the number of times of face detection execution is incremented, when the count is over a predetermined number of times (DDC represents a predetermined number set in advance), it is determined that there is no face present for in-plane angles of 0°, 90°, and 270° each with out-plane angles of left-side facing, straight-on facing and right-side facing, and then the routine proceeds to step 730. If the counter (dire) is less than the predetermined number of times then the routine returns to step 724.

At step 730, the counter (dire) for counting the number of times of face detection execution is reset. Next, in step 732, the out-plane (left side) discriminating device 90, the out-plane (straight-on) discriminating device 92, the out-plane (right side) discriminating device 94, the in-plane (0°) discriminating device 96, the in-plane (30°) discriminating device 98, and so on up to the in-plane (330°) discriminating device 118 are selected in the discrimination selection section 88, so that face detection is executed for out-plane angles of left-side facing, straight-on facing and right-side facing, and in-plane angles of 30°, 60°, 120°, 240°, 300° and 330°.

At step 734, similar processing is carried out as that in step 724 and so explanation thereof will be omitted, and comparison is carried out using the out-plane discriminating devices and the in-plane discriminating devices of image data formed for each specific image size 0 to 9 using template data with in-plane angles for each 30° interval corresponding to in-plane angles of 30°, 60°, 120°, 240°, 300° and 330°, and out-plane angles of left-side facing, straight-on facing and right-side facing.

Next, in step 736, similar processing is carried out as that in step 706, step 716, and step 726 and so explanation thereof will be omitted, and if an image size is detected showing an evaluation value calculated by the comparison section 62 of the predetermined threshold value or greater the routine proceeds to step 740 shown in FIG. 21. If no such image size is detected then the routine proceeds to step 739.

Next, in step 739, when the count is over a predetermined number of times (DDC represents a predetermined number set in advance) the current program is ended. Namely, the determination at step 739 is affirmative when no face has been detected to be present in the through-image subject to face detection with the current program. It should be noted that when the current program has been ended without detection of a face from this through-image, the current program is started again and face detection is initiated with the current program for the next through-image.

If the counter (dirc) is less than the predetermined number of times then the routine returns to step 734, and face detection is repeated for the same through-image data at the out-plane angle and the in-plane angle which correspond to the counter value.

Next, in step 740 of FIG. 21, determination is made as to whether or not the in-plane angle in the image data of the image size in which it is determined that a face is present in the step 706, step 716, step 726 and step 736 is within the range of 330° through 0° to 30°.

When this is the case, then in step 746 the angular range for use as the in-plane angle in the next face detection is set as the in-plane angle in which a face has been determined to be present ±30°. The method of setting the in-plane angle is set based on the orientation decision table show in Table 2 below.

The orientation decision table shown in Table 2 below sets the most often detected in-plane angle detected in face detection as the representative face angle, and sets the in-plane angles for each of the orientation specific modes from the relationship to the orientation discrimination modes of the horizontal/vertical mode and the multi-angle mode.

TABLE 2

| Representative Face Angle | Orientation Discrimination Mode | | | | | |
|---|---|---|---|---|---|---|
| | Horizontal/Vertical Mode | | | Multi-Angle Mode | | |
| 0° | 330° | 0° | 30° | 330° | 0° | 30° |
| 30° | 330° | 0° | 30° | 0° | 30° | 60° |
| 60° | 60° | 90° | 120° | 30° | 60° | 90° |
| 90° | 60° | 90° | 120° | 60° | 90° | 120° |
| 120° | 60° | 90° | 120° | 60° | 90° | 120° |
| 150° | — | — | — | — | — | — |
| 180° | — | — | — | — | — | — |
| 210° | — | — | — | — | — | — |
| 240° | 300° | 270° | 240° | 240° | 270° | 300° |
| 270° | 300° | 270° | 240° | 240° | 270° | 300° |
| 300° | 300° | 270° | 240° | 270° | 300° | 330° |
| 330° | 330° | 0° | 30° | 300° | 330° | 0° |

NB:
"—" indicates not subject to face detection

Figure 22:
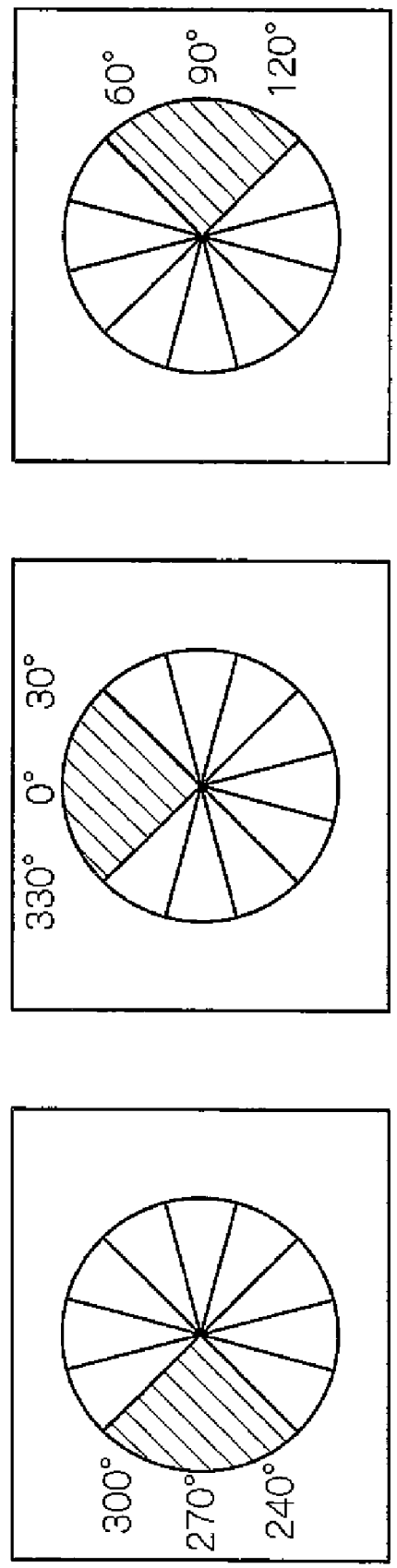
FIG. 22 is a graph for explaining a horizontal and upright mode.

The horizontal/vertical mode of the above Table 2 is configured with 3 types thereof, representing in-plane angle ranges of, in sequence from the left as shown in FIG. 22, 240° to 300°, 330° to 30°, and 60° to 120°. Since most faces are present in this mode with in-plane angles of 0°, 90° and 270°, the in-plane angle ranges are set centered around these angles.

Figure 23:
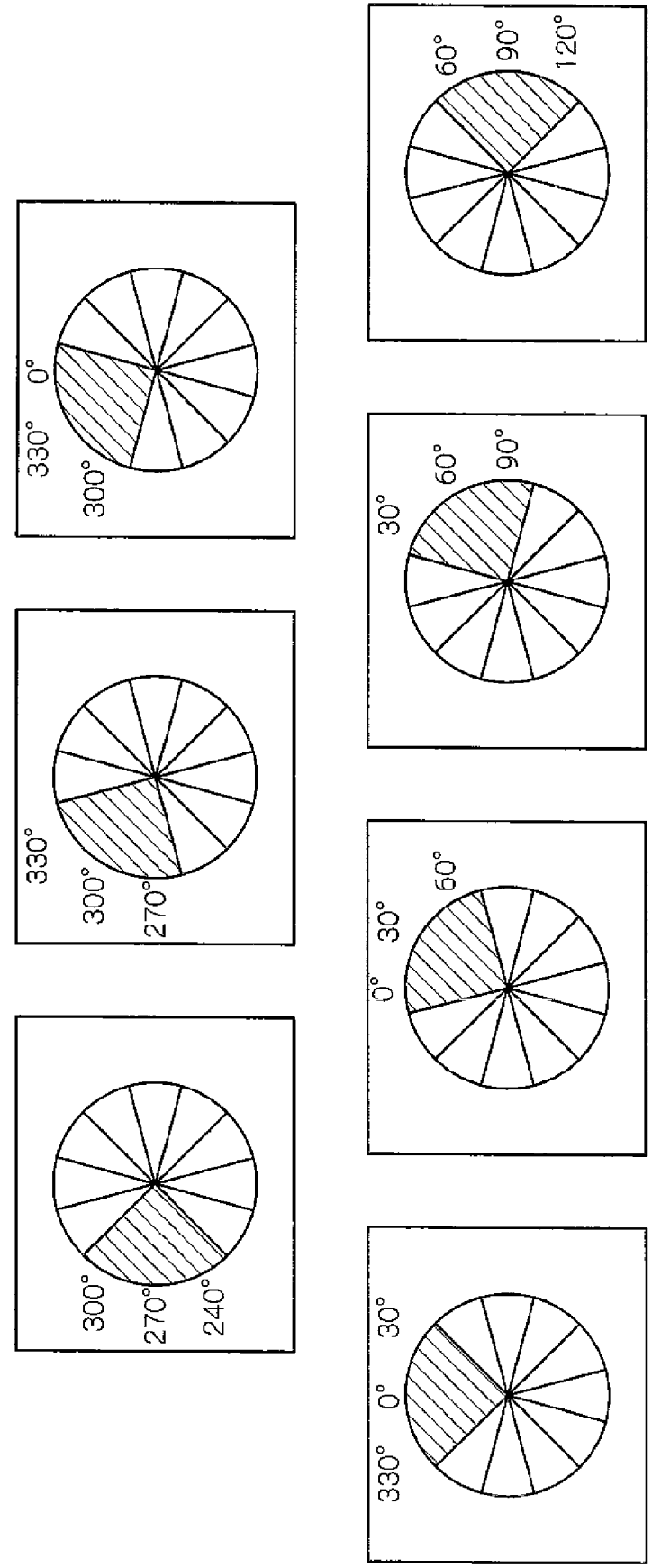
FIG. 23 is a graph for explaining a multi-angle mode.

Moreover, the multi-angle mode in the above Table 2 is configured with 7 types thereof, representing in-plane angle ranges of, in sequence from the left top as shown in FIG. 23, 240° to 300°, 270° to 330°, 300° to 0°, and in sequence from the left bottom 330° to 30°, 0° to 60°, 30° to 90° and 60° to 120°. Since these modes may be changed with angular ranges following units of 30°, when a photographic object face has changed slowly, face detection may be executed in a more appropriate angular range.

Accordingly, in this step 746, the in-plane angle range for use in face detection with the next through-image is set based on in-plane angle in which a face is has been detected, and on which ever of the above modes has been set.

It should be noted that the in-plane angle ranges in Table 2 are only an example thereof, and ranges may be set for the in-plane angle to be used in face detection for the next through-image data that are different to the in-plane angle ranges of Table 2.

When the range 330° through 0° to 30° does not apply in step 740, then the routine proceeds to step 742. In step 742, determination is made as to whether or not the in-plane angle included in the image data of the image size determined as having a face in step 706, step 716, step 726, and step 736 is an in-plane angle range of 60° trough 90° to 120°.

When this is the case, the routine proceeds to step 746. In step 746 the in-plane angle range to be used in face detection is set, as explained above. When this is not the case the routine proceeds to step 744.

In step 744, determination is made as to whether or not the in-plane angle included in the image data of the image size determined as having a face in step 706, step 716, step 726, and step 736 is an in-plane angle range of 240° through 270° to 300°.

When this is the case, the routine proceeds to step 746. In step 746 the in-plane angle range to be used in face detection is set, as explained above. When this is not the case the routine proceeds to step 734 (see FIG. 19).

It should be noted that the ranges of in-plane angles in which a face is detected (the ranges shown in step 740, step 742 and step 744) used for setting the in-plane angle range as shown in step 746 are only an example thereof, and other ranges may be used.

By carrying out the above described processing as initial discrimination, it is possible to predict whether or not a face is present whatever the image size or in-plane angle, and the present invention is applied to images photographed at consecutive times, and in particular where changes are generated in the out-plane angle of a face included in the image data, such as due to camera shake or movement of the photographic object.

Due to this, it is necessary, after the initial discrimination, to carry out face detection periodically according to changes in the out-plane angle. However, if face detection is undertaken using all of the out-plane angles then the processing time increases greatly, and so control is made such that face detection is not undertaken for the out-plane angles which do not require face detection.

Figure 24:
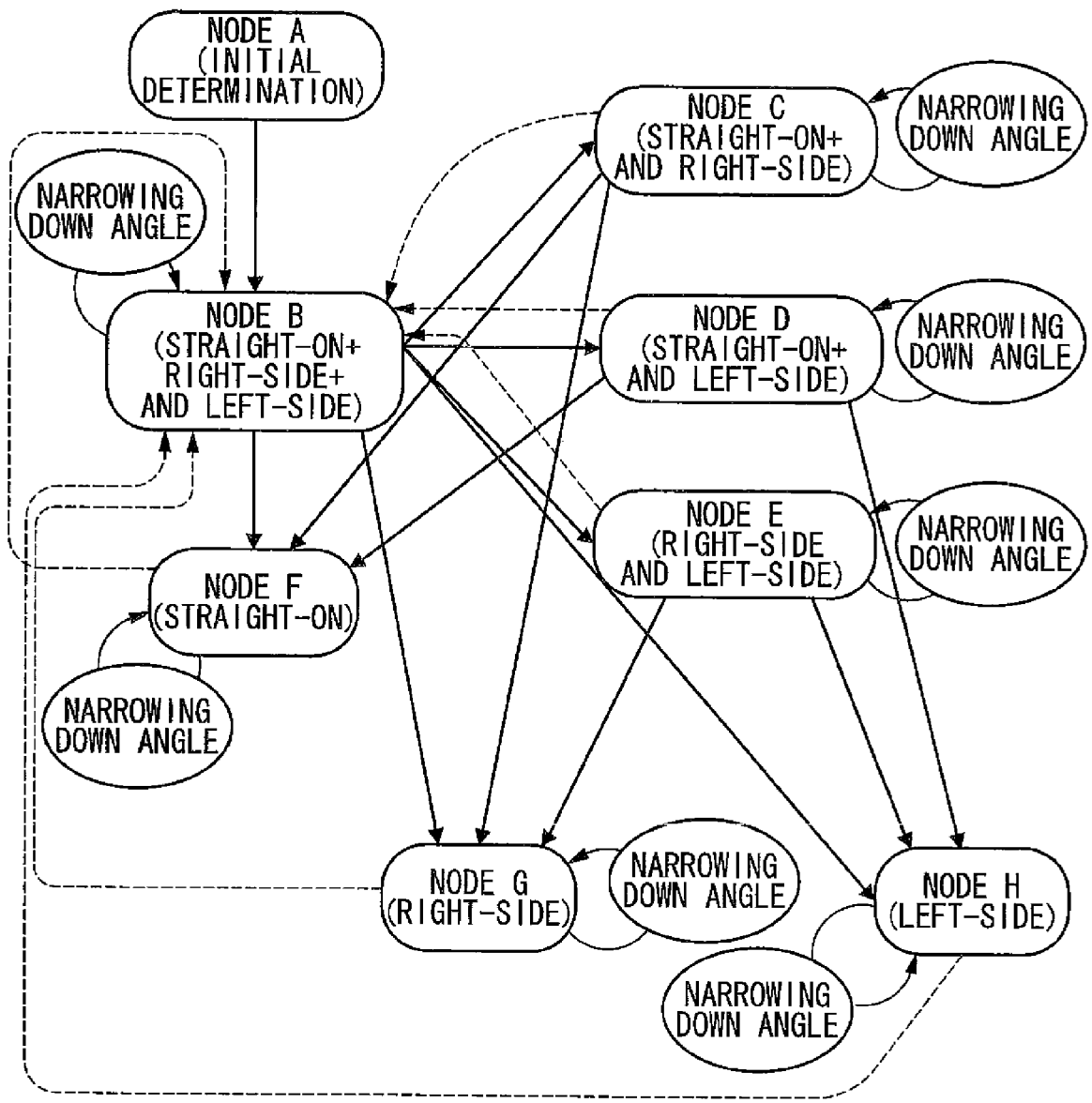
FIG. 24 is a transition diagram showing transitions in face detection processing of out-plane angle.

FIG. 24 shows a transition diagram of out-plane control. In this transition diagram node A represents the initial discrimination processing in the flow charts explained in FIGS. 18 to 21. Moreover, node B represents face detection execution for out-plane angles of straight-on, right-side, and left-side. In the same manner, for each out-plane angle for face detection execution, node C represents straight-on and right-side out-plane angles, node D represents straight-on and left-side out-plane angles, node E represents right-side and left-side out-plane angles, node F represents the straight-on out-plane angle, node G represents the right-side out-plane angle, and node H represents the left-side out-plane angle, and the arrow directions are directions of transition of processing.

As an example of transition, when face detection is executed at node B: if it is determined that a face has been detected for straight-on, and right-side out-plane angles, processing is transitioned to the node C; if it is determined that a face has been detected for straight-on and left-side out-plane angles processing is transitioned to node D; if it is determined that a face has been detected for the straight-on out-plane angle processing is transitioned to node F. Moreover, when a face is not detected at node B then face detection is repeatedly executed using the straight-on, right-side, and left-side out-plane angles.

Further, when face detection is repeated at each of the nodes, as shown in FIG. 24, the angle is narrowed down, namely an in-plane angle range is set and face detection is executed.

However, when repeatedly executing face detection, if determination is made that a face is not present then processing is transitioned in the directions of the intermittent arrows. As an example of a method of transitioning processing in the direction of an intermittent arrow, in nodes C to H, when face detection is executed a predetermined number of times (DN times), processing is transitioned in the intermittent arrow direction (with node B as the transition destination). It should be noted that that when there is no determination of a face being present after face detection for a predetermined number of successive times (DN times) then the transition may also be made to node A.

As another example of processing transition in the direction of an intermittent arrow direction, when the number of times of executing face detection is less than DN times and no face is determined to be present for a predetermined number of successive times (NN times) then processing is transitioned in the intermittent arrow direction (with node B as the transition destination). In a similar manner to the above, when the number of times of face detection execution is less than DN times and no face is determined to be present for a predetermined number of successive times (NN times) then processing may be transitioned to node A.

Figure 25:
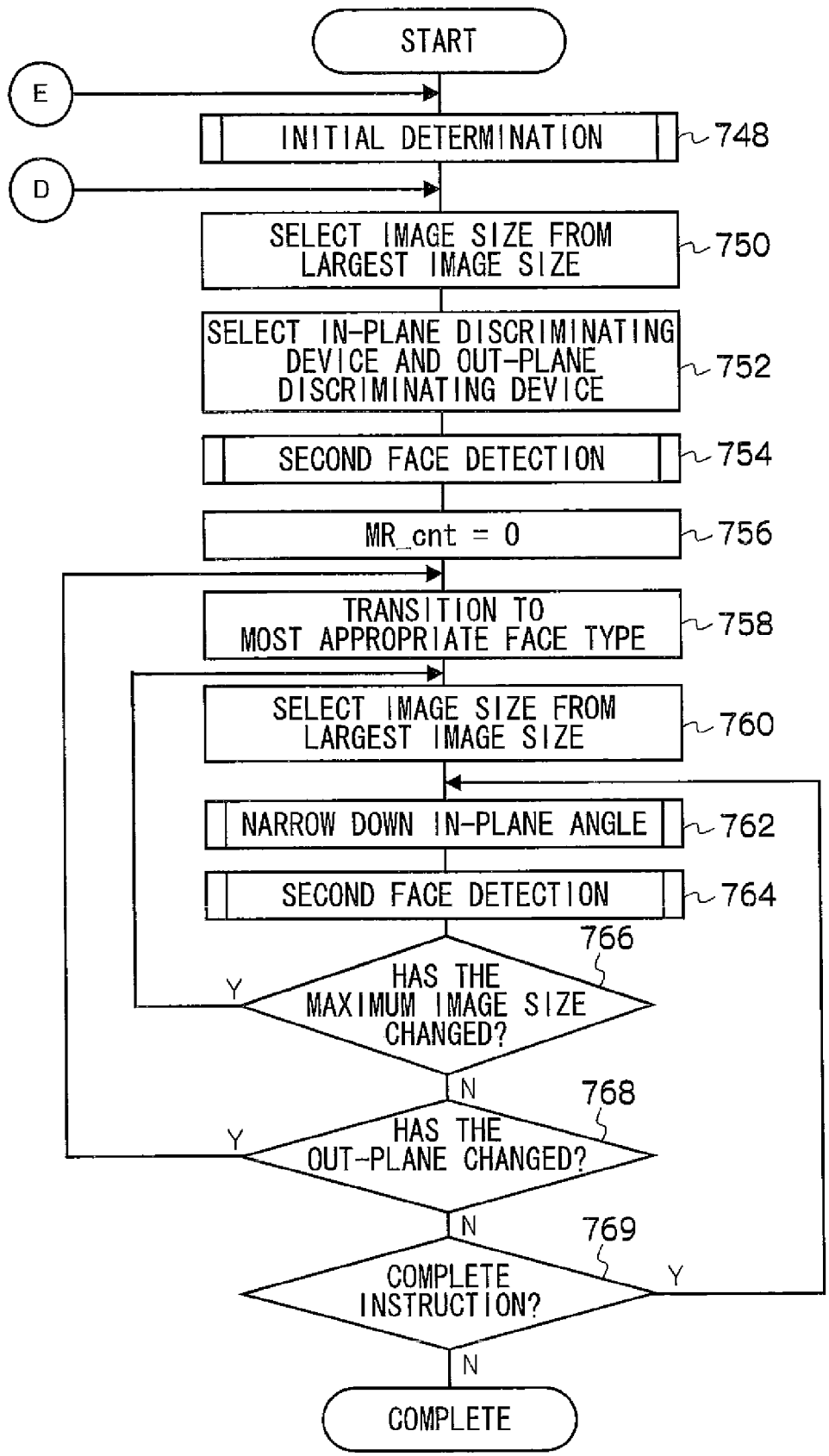
FIG. 25 is a flow chart for explaining processing in a face detection unit according to the third exemplary embodiment of the present invention.

Explanation will now be given of processing in the face detection unit 40 using the flow chart shown in FIG. 25. First, initial discrimination processing is carried out at step 748. In this step 748, similar processing is carried out to the contents explained of the flow charts shown in FIGS. 18 to 21 and so explanation thereof will be omitted.

Next, in step 750, the image size for use in the face detection for the next through-image is selected, from the largest image size of the image sizes detected in step 748. This selection method, as explained in the first exemplary embodiment and the modified example of the first exemplary embodiment, is either by selecting so as to include four image sizes in the vicinity of the largest image size, or selecting the image size using the restriction width chart (see FIG. 8B) and pattern transition table (see FIG. 9).

In step 752 the out-plane discriminating devices and in-plane discriminating devices in the discrimination selection section 88 corresponding to the straight-on, right-side, and left-side out-plane angles and the values set for the in-plane angles in step 746.

The out-plane (left side) discriminating device 90, the out-plane (straight-on) discriminating device 92 and the out-plane (right side) discriminating device 94 are selected in the discrimination selection section 88, and selection is made of whichever of the in-plane (0°) discriminating device 96, the in-plane (30°) discriminating device 98, and so on up to the in-plane (330°) discriminating device 118, correspond to the value set in step 746. The out-plane angles and the in-plane angles to be subject to face detection are set by this selection.

Next, in step 754, face detection is executed using the image sizes selected in step 750 and the out-plane angles and in-plane angles set in step 752.

Figure 26:
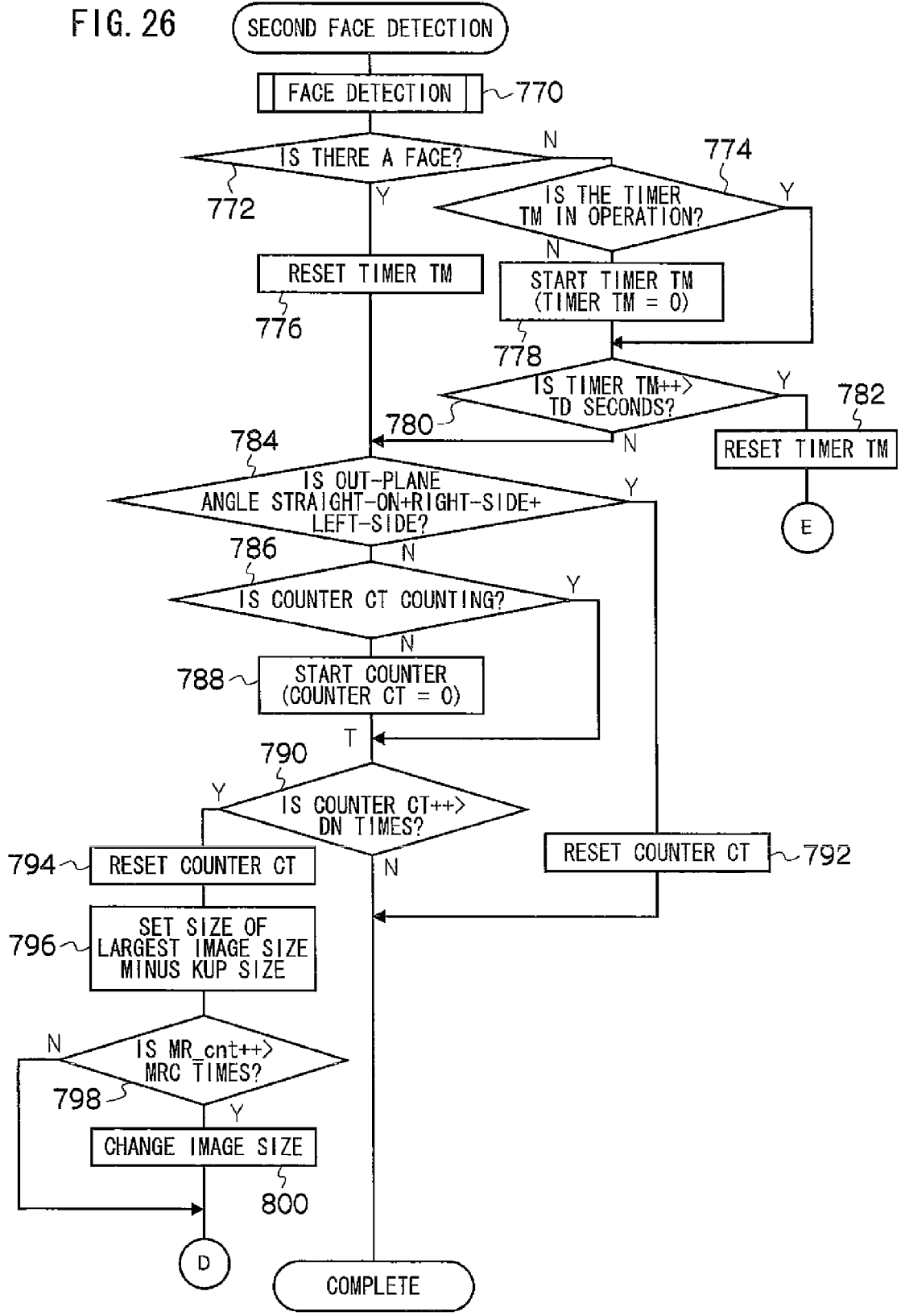
FIG. 26 is a flow chart for explaining details of face detection processing in a face detection unit according to the third exemplary embodiment of the present invention.

Explanation will now be given of details of the face detection of this step 754, with reference to the flow chart shown in FIG. 26.

Figure 20:
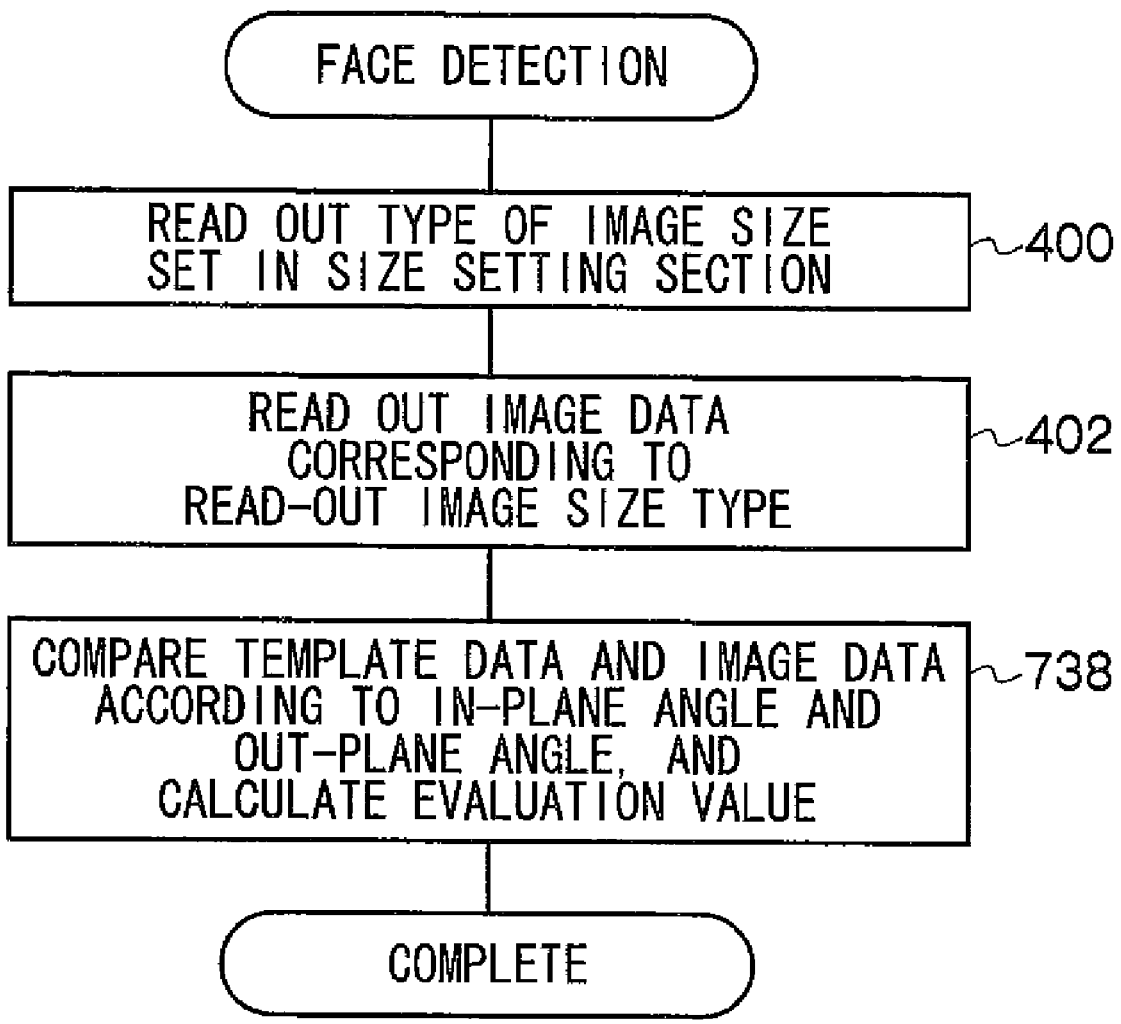
FIG. 20 is a flow chart for carrying out explanation of details of face detection processing according to the third exemplary embodiment of the present invention.

First, in step 770, face detection is executed using the image sizes selected in step 750 and the out-plane angles and in-plane angles set in step 752, and since this execution is similar to the processing of the face detection explained in FIG. 20, explanation thereof will be omitted.

Next, in step 772, determination is made as to whether or not there is a face present, based on the results of executing the face detection of step 770. Determination is made so that if, as a result of executing face detection for a predetermined time (TD seconds), determination is made that no face is detected, the processing of the flow chart of FIG. 25 is carried out again from the beginning.

The determination method is similar to the processing carried out in step 706, step 716, step 726, and step 736, and so explanation thereof will be omitted, When determination is made that no face present in step 772 the routine proceeds to step 774. In step 774, determination is made as to whether or not the timer TM is in operation. When determination in step 772 is that there is a face present then the timer TM is reset in step 776.

If the timer TM is in operation in step 774 then the routine proceeds to step 780. If the timer TM is not in operation then the routine proceeds to step 778 and the timer TM is initialized (set to 0).

Next, in step 780, comparison is carried out of the incremented value of the timer TM and the predetermined time (TD seconds). If the timer TM is the predetermined time (TD seconds) or greater the routine proceeds to step 782, and the processing of the flow chart shown in FIG. 25 returns to step 748. If the timer TM is less than the predetermined time (TD seconds) or greater the routine proceeds to step 784. It should be noted that timer TM ++ shown in step 780 represents the incremented value of the timer TM.

At step 784, determination is made as to whether or not the out-plane angle detected as a result of executing face detection of step 770 corresponds to all of the straight-on, right-side, and left-side out-plane angles. The reason for carrying out this determination is so that, as shown in FIG. 24, determination is made to execute the next face detection using straight-on, right-side, and left-side out-plane angles (transition to node B) when the out-plane angle is other than straight-on, right-side, and left-side, namely when the predetermined number of times DN times) of face detection execution in nodes C to H When determination is that there is no correspondence at step 784, the routine proceeds to step 786. In step 786, determination is made as to whether or not a counter CT, for counting the number of times face detection is executed using out-plane angles that are not the out-plane angles of straight-on, right-side, and left-side, is counting. If the counter CT is not counting then the routine proceeds to step 788, and the counter CT is activated and the counter CT is initialized (set to 0). If the counter CT is counting then the routine proceeds to step 790.

It should be noted that when correspondence is determined at step 784, the routine proceeds to step 792, and the counter CT is reset. The routine proceeds to step 756 of FIG. 25 after resetting.

At step 790, comparison is made of the incremented value of the counter CT with the predetermined number of times (DN times). If the counter CT is the predetermined number of times (DN times) or greater, the routine proceeds to step 794. When the counter CT is less than the predetermined number of times (DN times), the routine proceeds to step 756 of FIG. 25. It should be noted that counter CT ++ shown at step 790 indicates the counter CT has been incremented.

The counter CT is reset in step 794. After resetting the routine proceeds to step 796. As image size that is smaller than the largest image size detected at step 770 is set in step 796.

The setting is carried out so that it is possible to detect a large size face by setting the smaller image size, since it is impossible to carry out face detection for a large face that has appeared when photographing if face detection is carried out with the image size restriction width set for face detection with the smaller image size.

Next, in step 798, when the DN times of face detection execution, which is a condition for carrying out out-plane angle transition, is a predetermined number of successive times (MRC times) or greater, the image size for face detection is changed. This change is a change made such that the image size is periodically changed so that face detection is not executed only for a constant image size.

Accordingly, at step 798, comparison is made between the incremented value of a parameter MR_cnt, which counts the DN times of execution, and a predetermined number of times (MRC times). If the MR_cnt is the same as the predetermined number of times (MRC times) or greater the routine proceeds to step 800. If the MR_cnt is less than the predetermined number of times (MRC times) then the routine returns to step 750 shown in FIG. 25. It should be noted that MR_cnt ++ shown in step 798 indicates the MR_cnt which has been incremented.

The image size for use in the next face detection is changed in step 800. As an example of the image size, "0" representing the smallest image size level is selected. After selection, the routine proceeds to step 750. It should be noted that in this step 800, an image size level other than "0" representing the smallest image size level may be selected, which is smaller than the image size detected in step 770.

This completes the explanation relating to the face detection of the step 754 shown in FIG. 25, and explanation will now be given of the processing of step 756 shown in FIG. 25.

In step 756, initialization (setting to 0) is carried out of the MR_cnt explained above. The routine proceeds to step 758 after setting. At step 758 the in-plane angles selected in face detection of step 754 are selected from the out-plane angles straight-on, right-side, and left-side.

Next, in step 760, the image size to be used in the face detection for the next through-image is selected from the largest image size of the image sizes detected at step 754. Since the selection method is selection carried out according to the method explained above for step 750, explanation thereof will be omitted.

Figure 27:
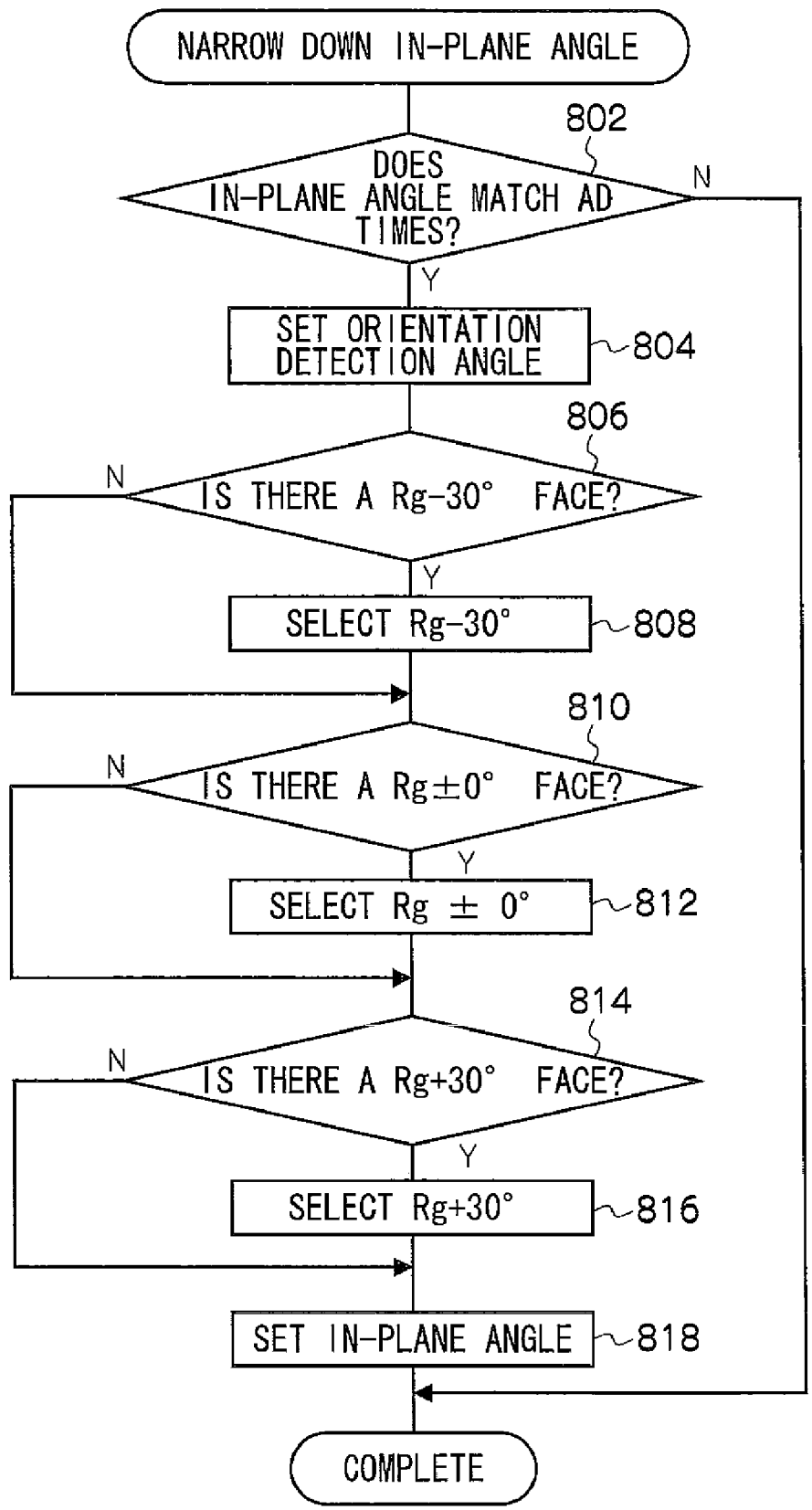
FIG. 27 is a flow chart for explaining processing that specifies the in-plane angle set range.

Next, in step 762, the in-plane angle range is determined for use in face detection. Explanation will now be given of details of the processing of this step with reference to the flow chart shown in FIG. 27.

First, in step 802, determination is made as to whether or not the number of times the result of executing face detection on the through-image up to the previous time corresponds to the set in-plane angle, matches a predetermined number of times (AD times). The reason for setting the predetermined number of times (AD times) is so as to realize a reduction in processing load that would be generated by frequently setting the in-plane angle range. When there is a match the routine proceeds to step 804. When there is no match the routine proceeds to step 764 shown in FIG. 25.

In step 804, the in-plane angle set in step 746 is set as the orientation detection angle (Rg). After setting, determination is made in step 806 as to whether or not a face was detected during the previous face detection for a calculated in-plane angle of the Rg set in step 804 less 30°. When detection was made, in the next step 808, this angle is selected as the in-plane angle. When no detection was made, the routine proceeds to step 810.

In step 810 determination is made as to whether or not a face was detected during the previous face detection in the in-plane angle representing the Rg set in step 804. When detection was made, in the next step 812, this angle is selected as the in-plane angle. When no detection was made, the routine proceeds to step 814.

In step 814 determination is made as to whether or not a face was detected during the previous face detection for a calculated in-plane angle of the Rg set in step 804 plus 30°. When detection was made, this angle is selected in the next step 816 as the in-plane angle. When no detection was made, the routine proceeds to step 818.

Next, in step 818, the in-plane angle that is to be the representative in-plane angle is selected from the in-plane angles selected in step 808, step 812, and step 816. As the method of selecting the in-plane angle that is to be the representative in-plane angle, the in-plane angle with the most detections from the above Rg, the calculated angle of Rg minus 30°, and the calculated angle of Rg plus 30° may be selected.

Next, in step 764, face detection for the through-image is executed on the basis of the out-plane angle selected in step 758, the image size selected in step 760, and the in-plane angle selected in step 762.

It should be noted that the contents of the processing of step 764 are the similar to those of step 754, and explanation thereof will be omitted.

Next, in step 766, when there is a change in the largest image size based on the results of the face detection executed in step 764 the routine proceeds to step 760. In step 760, as described above, the image size to be used in the next face detection is selected, from the largest image size. It should be noted that the selection method employed is similar to that described for step 750, and so explanation thereof will be omitted.

In step 766, when there has been no change in the largest image size, the routine proceeds to step 768. In step 768, when the out-plane angle obtained by executing face detection in step 764 has changed from that of the previous time of face detection, the routine proceeds to step 758. In step 758, the out-plane angle obtained by face detection execution in step 764 is selected. In step 768, if the out-plane angle has not changed from the previous time of face detection then the routine proceeds to step 769.

At step 769, determination is made as to whether or not an instruction to cease face detection processing on the through-image has been input, and when the determination is affirmative the current program is ended. However, when the determination is that no such instruction has been input, the routine returns to step 762, and face detection is repeated on the through-image.

Fourth Exemplary Embodiment

Explanation will now be given of a fourth exemplary embodiment of the present invention.

In the above first exemplary embodiment to third exemplary embodiment and modified example of the first exemplary embodiment, all of the image data used in face detection is used as the region subject to face detection execution, and portions of image data are clipped form the subject region, and face detection is performed by comparison being carried out of the clipped portions of image data with the template data.

Figure 28:
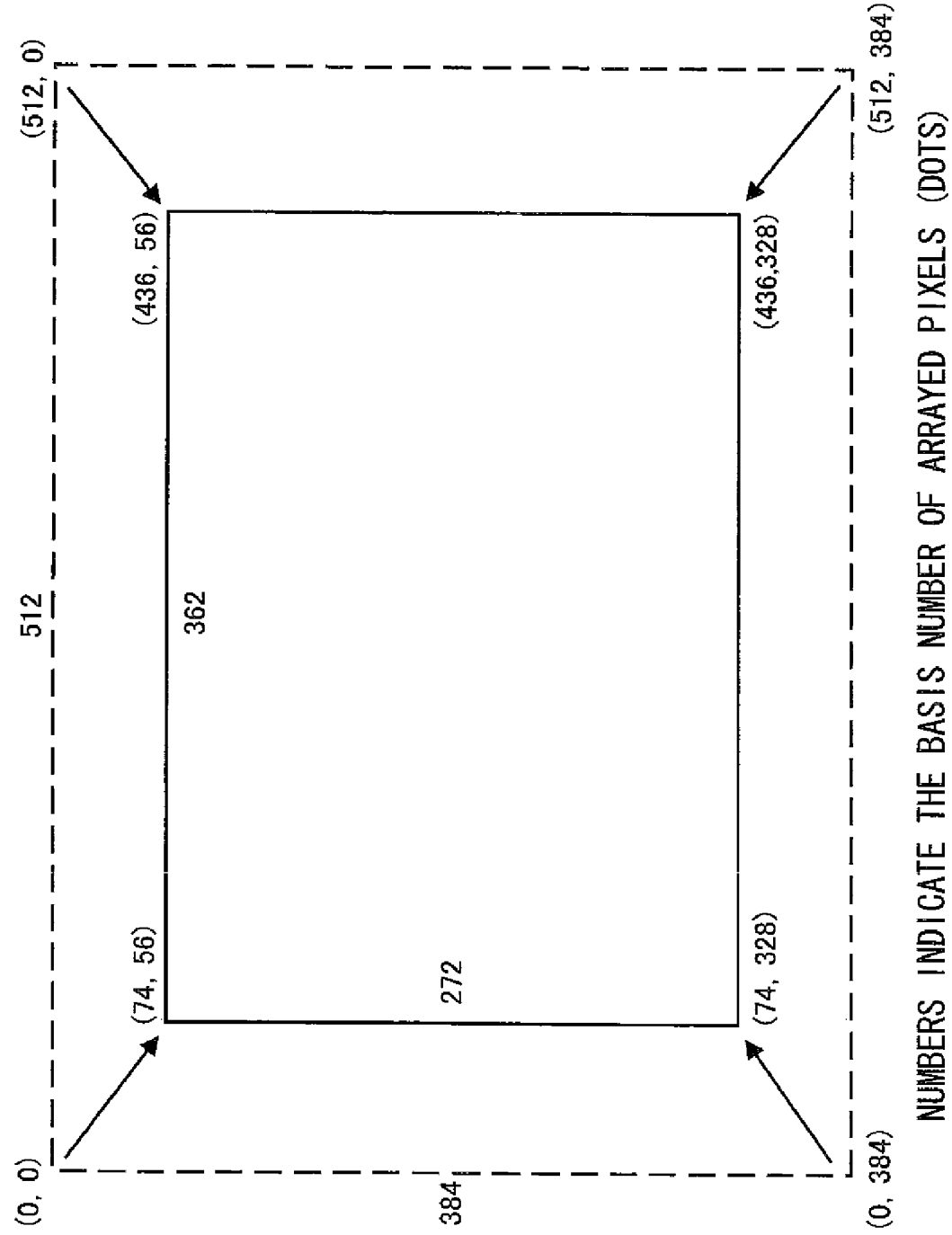
FIG. 28 is an explanatory diagram for explaining the overall image size and an inside region of the image size.
Figure 29:
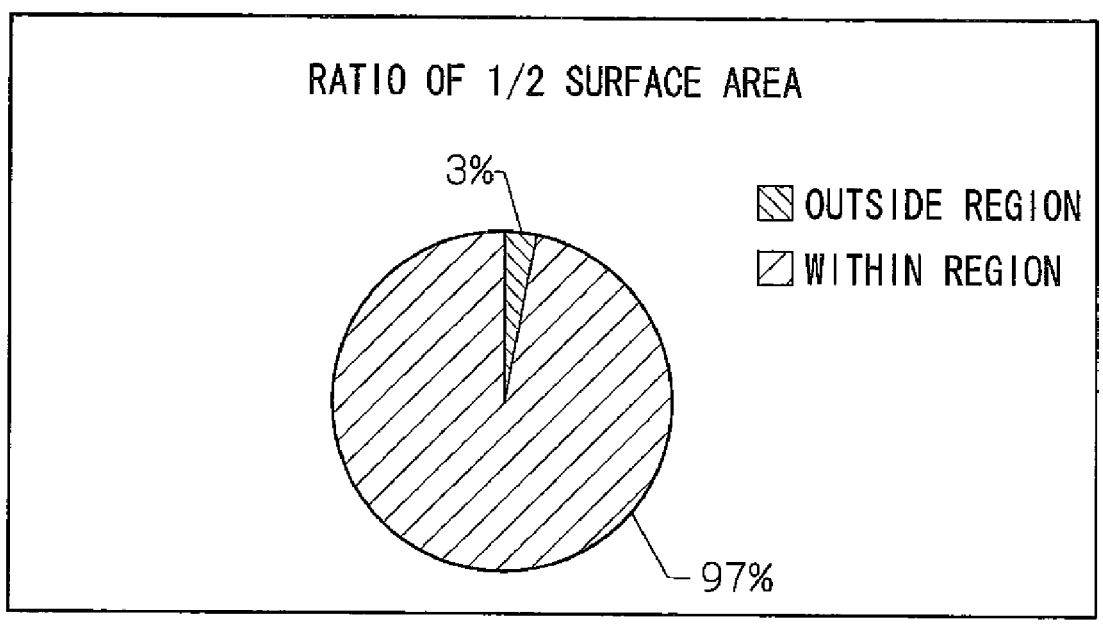
FIG. 29 is a graph showing the certainty of a face being present in an inside region of the overall image size.

However, generally in a photographic object, as exemplified in FIG. 28, it is apparent from the investigations of the current inventor that the probability of a face being present in a region (width 362 dots, height 272 dots) at the inside of a whole image size (width 512 dots, height 384 dots) is the probability shown in FIG. 29.

Namely, even in a region narrowed toward the center so as to have a surface area that is ½ that of the entire image size surface area, the probability that a face is present within the narrowed region is 97%.

In recognition of this, the fourth exemplary embodiment reduces the number of times comparison is carried out of image data with template data by narrowing the subject region for face detection, with the objective of executing faster face detection.

The configuration of a control system for a digital camera 1 according to the fourth exemplary embodiment is similar to the configuration of the control system of the digital camera according to the above first exemplary embodiment (see FIG. 1), and the same reference numerals are used and explanation thereof omitted.

Figure 30:
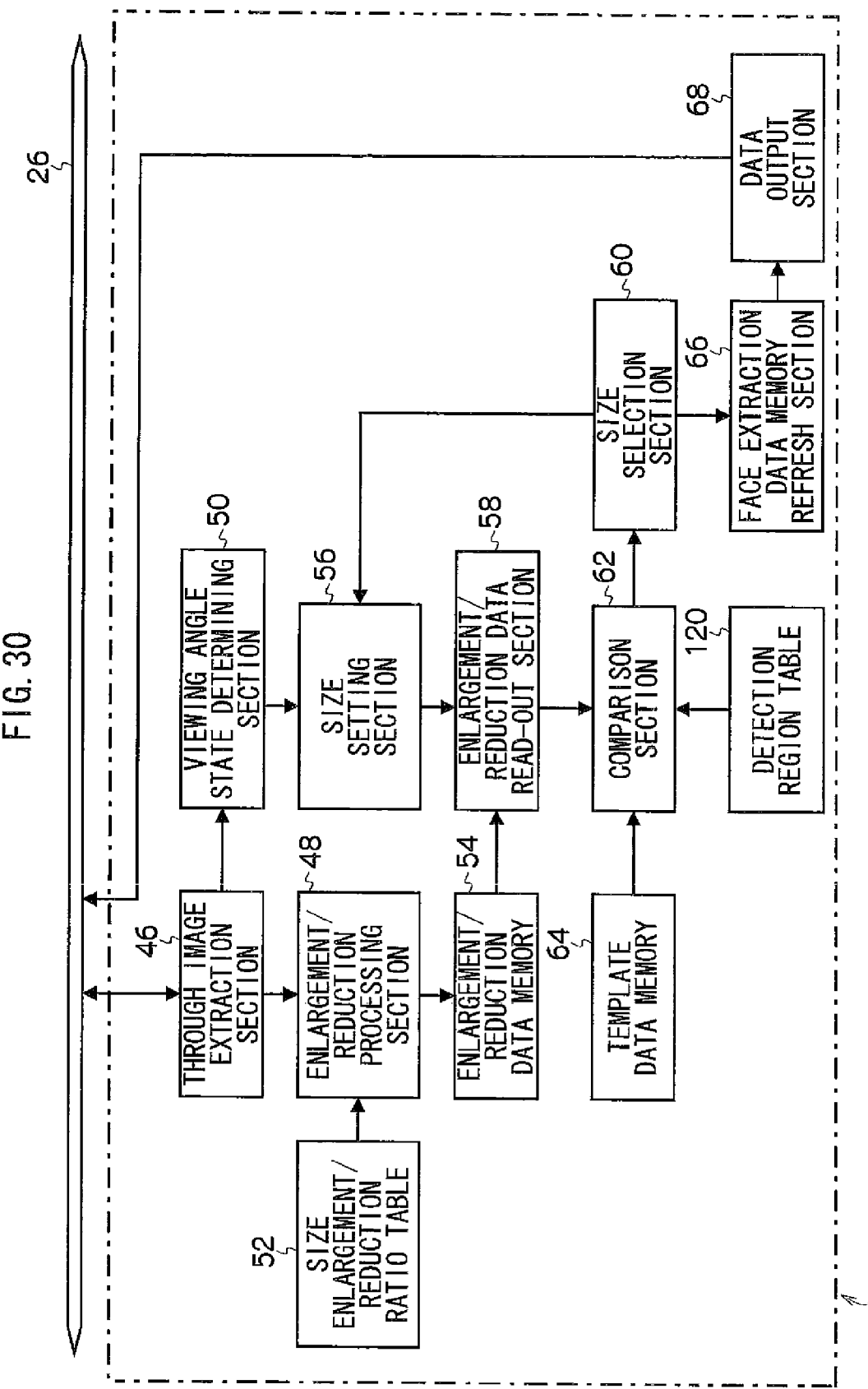
FIG. 30 is a block diagram showing a configuration of a face detection unit for performing face detection processing according to a fourth exemplary embodiment of the present invention.

Moreover, explanation will be given relating to the configuration of the face detection unit 40 for executing face detection with reference to FIG. 30, and similar parts of the configuration to those of the face detection unit 40 (see FIG. 2) explained in the first exemplary embodiment are allocated the same reference numerals, explanation thereof will be omitted, and only the difference in the configuration will be explained.

The difference from the face detection unit 40 of the first exemplary embodiment is that there is a detection region table 120 provided for storing data necessary for compacting the subject region for face detection according to the image size. The detection region table 120 is connected to the comparison section 62. The comparison section 62 reads out the data stored in the detection region table 120, and shrinks the subject region for face detection based on the read-out data and compares the image data with the template data.

The detection region table 120 is set in advance, for example, with reduction proportions (%) for narrowing the image data surface area toward the center, for the specific image sizes 0 to 9, as shown in Table 3 below.

TABLE 3

| Image Size (Level) | Detection Region (%) |
|---|---|
| 0 | 100 |
| 1 | 100 |
| 2 | 100 |
| 3 | 100 |
| 4 | 100 |
| 5 | 90 |
| 6 | 80 |
| 7 | 70 |
| 8 | 60 |
| 9 | 50 |

Since generally the subject of a photographic object is positioned in the image data center, Table 3 is set such that the processing time for executing face detection is reduced for image data for large image sizes, by setting the edge regions of the image data so as not to be subjected to detection.

The comparison section 62 reads out the proportion applicable to the image data size for comparison from the detection region table 120, and derives information representing the detection start position and the detection end position of the detection subject region in the image data, thereby narrowing the detection subject region of the image data. Then portions of image data are clipped from within the narrowed region, and face detection processing is performed by carrying out a comparison between the clipped portions of image data and the template data.

Fifth Exemplary Embodiment

Explanation will now be given of a fifth exemplary embodiment of the present invention.

In the fourth exemplary embodiment the subject region for face detection is narrowed toward the center of the image data according to the image size used in the face detection.

However, generally for a photographic object with a face that has an out-plane angle that is completely side-on, there are extremely few occasions when a face is present in the image data of the right edge portion, and moreover, a small face present in such edge image data is rarely the main subject of the photographic object.

In recognition of this, the fifth exemplary embodiment reduces the number of times comparison is carried out of image data and template data by taking into consideration the image size used in face detection and also by narrowing the face detection subject region toward the center according to the face out-plane angle, with the objective of realizing even faster face detection.

The configuration of a control system for a digital camera 1 according to the fifth exemplary embodiment is similar to the configuration of the control system of the digital camera according to the above first exemplary embodiment (see FIG. 1), and in addition, the configuration of the face detection unit 40 is similar to that of the fourth exemplary embodiment and the same reference numerals are allocated thereto, and explanation thereof will be omitted.

The detection region table 120 in the fourth exemplary embodiment has data stored that is required for narrowing the face detection subject region according to the image size of the image data, however, the detection region table 120 of the fifth exemplary embodiment, as exemplified in Table 4 below, sets narrowing proportions of the image data surface area toward the center for each of the image sizes 0 to 9 and for each of the out-plane angles. Namely, the regions are changed according to each of the levels of image size and the determined out-plane angle.

TABLE 4

| Out-Plane Angle | Image Size (Level) | | | | | | | | | |
|---|---|---|---|---|---|---|---|---|---|---|
| | 0 | 1 | 2 | 3 | 4 | 5 | 6 | 7 | 8 | 9 |
| −90° | 100 | 100 | 100 | 90 | 80 | 70 | 60 | 50 | 0 | 0 |
| −45° | 100 | 100 | 100 | 100 | 90 | 80 | 70 | 60 | 50 | 0 |
| 0° | 100 | 100 | 100 | 100 | 100 | 90 | 80 | 70 | 60 | 50 |
| 45° | 100 | 100 | 100 | 100 | 90 | 80 | 70 | 60 | 50 | 0 |
| 90° | 100 | 100 | 100 | 90 | 80 | 70 | 60 | 50 | 0 | 0 |

NB:
narrowing proportions are shown as percentages.

The comparison section 62 reads out data stored in the detection region table 120, based on size identification data, the size identification data having been set in the size setting section 56 and input through the enlargement/reduction data read-out section 58.

Figure 31:
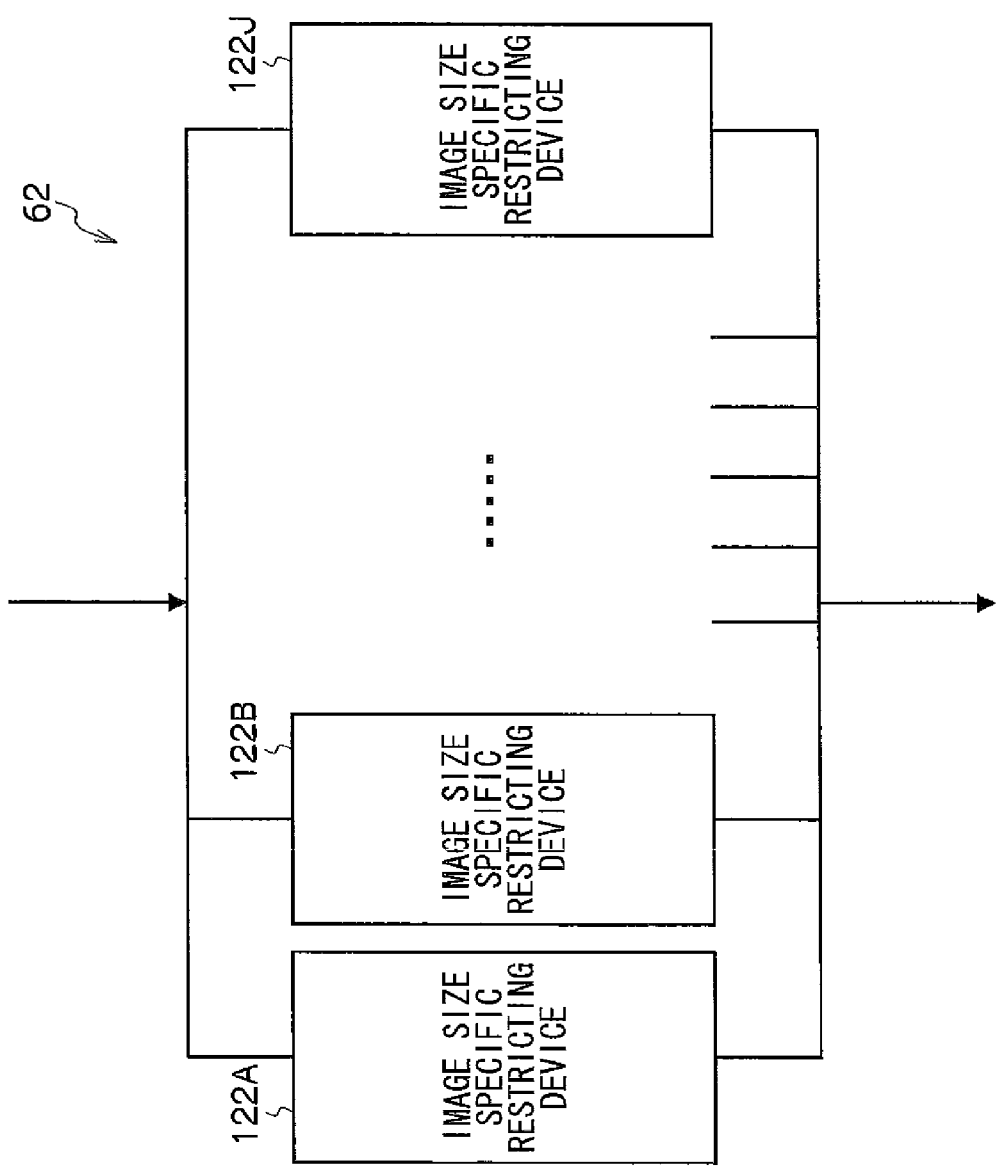
FIG. 31 is a block diagram showing image size specific restricting devices for controlling whether or not to execute face detection according to the fourth exemplary embodiment of the present invention.

In addition, as shown in FIG. 31, image size specific restricting devices 122A to 122J, for controlling whether or not face detection is to be executed depending on the out-plane angle and for the setting face detection subject region, are provided to the comparison section 62 for use with each specific image size in face detection (image size specific restricting devices 122C to 122I are omitted in the figure). The comparison section 62 selects whichever of image size specific restricting devices 122A to 122J corresponds to the image size, based on the size identification data. Then, after selection, the comparison section 62 outputs data read out from the detection region table 120 to whichever of the image size specific restricting devices 122A to 122J has been selected.

Figure 32:
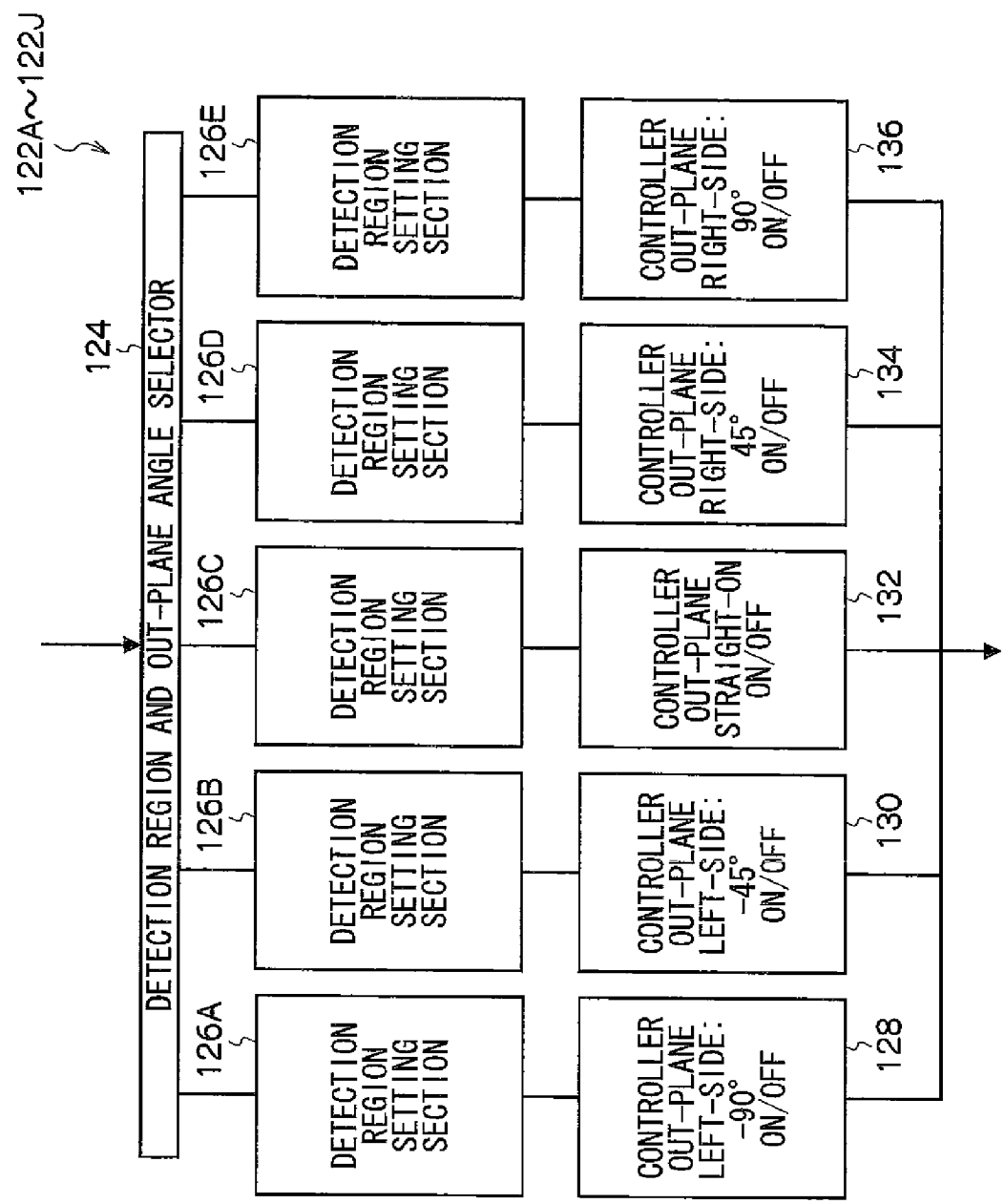
FIG. 32 is a block diagram showing a configuration of image size specific restricting devices according to the fourth exemplary embodiment of the present invention.

The image size specific restricting devices 122A to 122J, as shown in FIG. 32, are configured including: a detection region and out-plane angle selector 124; respective detection region setting sections 126A to 126E; and respective controllers 128 to 136.

The detection region and out-plane angle selector 124 is connected to the detection region setting sections 126A to 126E for setting the subject region for face detection execution. The detection region and out-plane angle selector 124 selects the detection region setting section 126A to 126E that corresponds to the out-plane angle that is to be subject to face detection, based on the data read out from the detection region table 120.

After selection, the data for determining the image data detection region and the data representing whether or not face detection is to be executed is output to each of the detection region setting sections 126A to 126E. Each of these detection region setting sections 126A to 126E sets the subject region for face detection execution based on the detection region and data output from the out-plane angle selector 124 for determining the detection region of the image data.

The detection region setting section 126A is connected to the respective controller 128. The controller 128 sets data representing whether or not out-plane angle −90° (left-side facing) face detection is to be executed, based on data input through the detection region setting section 126A representing whether or not face detection is to be executed. When face detection is to be executed the setting is ON, and when the face detection is not to be executed the setting is OFF. Similar processing is executed in the other controllers 130 to 136, with the controller 130 corresponding to an out-plane angle of −45°, the controller 132 to an out-plane angle of 0°, the controller 134 to an out-plane angle of 45°, and the controller 136 to 90°.

Accordingly, the method of comparing the image data with the template data in the comparison section 62 according to the firth exemplary embodiment is by clipping portions of image data in the subject regions set by the detection region setting sections 126A to 126E and computing an evaluation value representing the relationship between the brightness value of the clipped portion of image data with the brightness value of the template data, using the clipped portions of image data, and the template data corresponding to the out-plane angle(s) set to ON in the controllers 128 to 130.

Figure 33A:
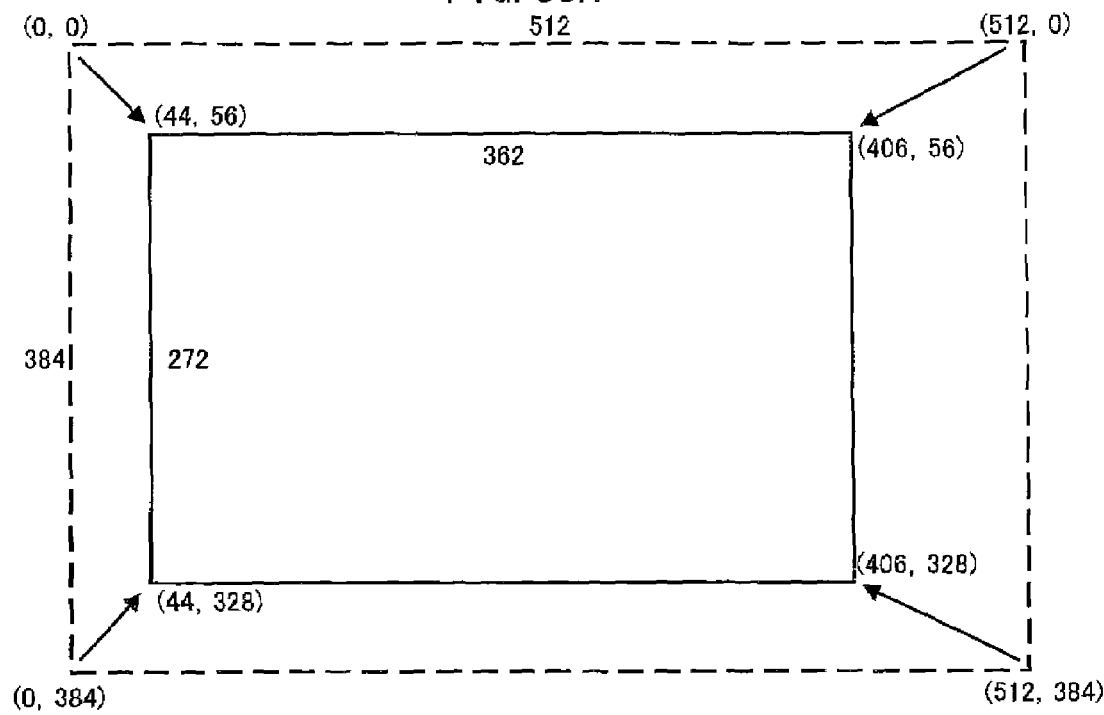
FIG. 33A is an explanatory diagram for explaining shifting to the left the center position of the subject region according to the face direction of the image data.

It should be noted that since there is only a small possibility a right-side face present in the right edge of the image data is the subject of the photographic object, setting may be made such that no face detection for a right-side face is executed in the right edge portion of the image data, by shifting the center position of the subject region for face detection execution to the left, as shown in FIG. 33A.

Figure 33B:
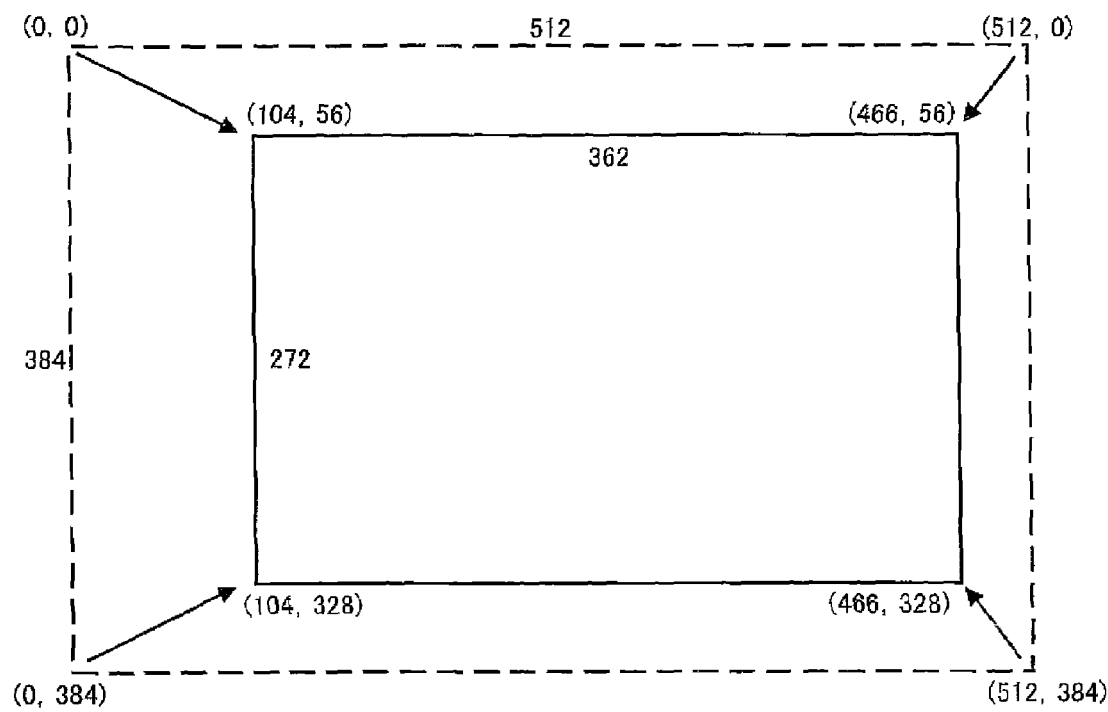
FIG. 33B is an explanatory diagram for explaining shifting to the right the center position of the subject region according to the face direction of the image data.

Similarly, since there is only a small possibility that a left-side face present at the right edge of the image data is the subject of the photographic object setting may be made such that no face detection for a left-side face is executed in the left edge portion of the image data, by shifting the center position of the subject region for face detection execution to the left, as shown in FIG. 33B.

With respect to this, the direction of shifting of the central position of the image data is set for each of the image sizes 0 to 9 and each of the out-plane angles in the detection region table 120, as shown in Table 5 below.

TABLE 5

| Out-Plane Angle | Image Size (Level) | | | | | | | | | |
|---|---|---|---|---|---|---|---|---|---|---|
| | 0 | 1 | 2 | 3 | 4 | 5 | 6 | 7 | 8 | 9 |
| −90° | C | C | C | C | L | L | L | L | L | L |
| −45° | C | C | C | C | C | C | C | C | C | C |
| 0° | C | C | C | C | C | C | C | C | C | C |
| 45° | C | C | C | C | C | C | C | C | C | C |
| 90° | C | C | C | C | R | R | R | R | R | R |

NB.
C: no subject region shift,
R: right shift of subject region, L: left shift of subject region For example, "C" in Table 5 above indicates narrowing of the surface area toward the center of the image data without shifting of the central position of the region subject to face detection, "L" indicates a shift of the central position of the subjected region to the left (see FIG. 33A), and "R" indicates a shift of the central position of the subjected region to the right (see FIG. 33B).

The comparison section 62 sets the subject region for face detection execution for image data in the detection region setting sections 126A to 126E based on the data shown in the above Table 5 set in the detection region table 120, and carries out comparison of the image data with the template data.

In addition a detection region table 120 that considers combinations of the proportion (%) by which the image data surface area is narrowed toward the center, as shown in Table 4, may be used together with shifts of the central position of the subject region, as shown in Table 5.

In the above manner, fast face detection is enabled since the conditions with which face detection is carried out on the current occasion are set so as to reduce the number of times image data is read out, based on the conditions of face detection the previous time, such as the face size of the photographic object detected, the facing direction of the face, the upright direction and the like.

Explanation has been given of the present invention by way of each of the above exemplary embodiments, however, the technological scope of the present invention is not limited to the described range of the above exemplary embodiments and various modifications or improvements can be added to the above exemplary embodiments without departing from the spirit of the invention, with these modified or improved embodiments included within the technological scope of the present invention.

In addition, each of the above exemplary embodiments do not limit the invention according to the claims, and all of the features combined in the explanation of the exemplary embodiments are not necessarily essential elements for solving the problem of the invention. There are various stages of invention included in the above described exemplary embodiments, and various modes of the invention can be derived from combinations of plural elements of the configurations disclosed. Where the effect of the invention can be obtained even when some of the elements of the configuration are removed from the overall configuration shown in each of the above exemplary embodiments, the invention can also be obtained derived from such a configuration in which some of the elements have been removed.

In addition, the configuration of the digital camera 1 (see FIGS. 1 and 2) explained in the above exemplary embodiments is only an example thereof, and obviously unnecessary components may be removed, and new components may be added, as long as the spirit of the invention is not departed from.

The process flows of each of the programs (see FIGS. 4, 5, 10, 15, 18, 19, 20, 21, 25, 26 and 27) explained in the above exemplary embodiments are also only examples thereof, and obviously unnecessary steps may be removed, new steps may be added, and the processing sequence may be swapped around as long as the spirit of the invention is not departed from.

What is claimed is:

1. A face detection method comprising:
classifying a plurality of images, generated by enlargement or reduction of time-wise successively captured images according to plurality of specific multipliers, into levels by image size of the images using a processor;
sequentially reading out at one read-out unit at a time the images classified into each of the levels, using as the read-out unit a size that is smaller than the smallest image size from the image sizes of the classified images using a processor;
carrying out face detection processing by a processor to detect images in which it is determined that a face is present in portions of image divided up into the read-out units, wherein when the face detection processing is repeatedly carried out to the time-wise successively captured images the number of candidate levels of the images used for the face detection processing for the next image is set based on the level(s) of image size of images in which it has been determined there is a face present so that the number of candidate levels is less that the total number of levels.

2. The face detection method according to claim 1, wherein the settable number of candidate levels is set based on the image size(s) in which it has been determined that a face is present the previous time face detection processing was carried out.

3. The face detection method according to claim 1, further comprising:
additionally setting a function for discriminating using an out-plane angle, representing the left-right facing direction of a face, as a parameter for subjecting to face detection processing, wherein the number of types of the out-plane angle to be subjected to face detection processing is set to be fewer as the image size of the classified images increases.

4. The face detection method according to claim 2, further comprising:
additionally setting a function for discriminating using an out-plane angle, representing the left-right facing direction of a face, as a parameter for subjecting to face detection processing, wherein the number of types of the out-plane angle to be subjected to face detection processing is set to be fewer as the image size of the classified images increases.

5. The face detection method according to claim 3, wherein the face detection processing is carried out within a region set in advance for each of the levels of image, the region being set according to the out-plane angle(s) in which a face has been determined to be present by the face detection processing the previous time.

6. The face detection method according to claim 4, wherein the face detection processing is carried out within a region set in advance for each of the levels of image, the region being set according to the out-plane angle(s) in which a face has been determined to be present by the face detection processing the previous time.

7. The face detection method according to claim 1, further comprising:
additionally setting a function for discriminating using an in-plane angle, representing the degree of angular rotation of a face to the upright direction, as a parameter for subjecting to face detection processing, wherein when the face detection processing is carried out repeatedly the number of patterns of the in-plane angle to be used in the face detection processing for the next image is set to be fewer than the total number of the patterns, and the number of patterns are set so as to belong to a specific angular range around the in-plane angle in which a face was detected to be present the previous time.

8. The face detection method according to claim 2, further comprising:
additionally setting a function for discriminating using an in-plane angle, representing the degree of angular rotation of a face to the upright direction, as a parameter for subjecting to face detection processing, wherein when the face detection processing is carried out repeatedly the number of patterns of the in-plane angle to be used in the face detection processing for the next image is set to be fewer than the total number of the patterns, and the number of patterns are set so as to belong to a specific angular range around the in-plane angle in which a face was detected to be present the previous time.

9. The face detection method according to claim 3, further comprising:
additionally setting a function for discriminating using an in-plane angle, representing the degree of angular rotation of a face to the upright direction, as a parameter for subjecting to face detection processing, wherein when the face detection processing is carried out repeatedly the number of patterns of the in-plane angle to be used in the face detection processing for the next image is set to be fewer than the total number of the patterns, and the number of patterns are set so as to belong to a specific angular range around the in-plane angle in which a face was detected to be present the previous time.

10. The face detection method according to claim 4, further comprising:
additionally setting a function for discriminating using an in-plane angle, representing the degree of angular rotation of a face to the upright direction, as a parameter for subjecting to face detection processing, wherein when the face detection processing is carried out repeatedly the number of patterns of the in-plane angle to be used in the face detection processing for the next image is set to be fewer than the total number of the patterns, and the number of patterns are set so as to belong to a specific angular range around the in-plane angle in which a face was detected to be present the previous time.

11. The face detection method according to claim 5, further comprising:
additionally setting a function for discriminating using an in-plane angle, representing the degree of angular rotation of a face to the upright direction, as a parameter for subjecting to face detection processing, wherein when the face detection processing is carried out repeatedly the number of patterns of the in-plane angle to be used in the face detection processing for the next image is set to be fewer than the total number of the patterns, and the number of patterns are set so as to belong to a specific angular range around the in-plane angle in which a face was detected to be present the previous time.

12. The face detection method according to claim 6, further comprising:
additionally setting a function for discriminating using an in-plane angle, representing the degree of angular rotation of a face to the upright direction, as a parameter for subjecting to face detection processing, wherein when the face detection processing is carried out repeatedly the number of patterns of the in-plane angle to be used in the face detection processing for the next image is set to be fewer than the total number of the patterns, and the number of patterns are set so as to belong to a specific angular range around the in-plane angle in which a face was detected to be present the previous time.

13. The face detection method according to claim 1, wherein, the face detection processing is carried out within a region set in advance for each of the levels of image according to the image size of the images for each of the levels.

14. The face detection method according to claim 2, wherein, the face detection processing is carried out within a region set in advance for each of the levels of image according to the image size of the images for each of the levels.

15. The face detection method according to claim 3, wherein, the face detection processing is carried out within a region set in advance for each of the levels of image according to the image size of the images for each of the levels.

16. The face detection method according to claim 4, wherein, the face detection processing is carried out within a region set in advance for each of the levels of image according to the image size of the images for each of the levels.

17. The face detection method according to claim 5, wherein, the face detection processing is carried out within a region set in advance for each of the levels of image according to the image size of the images for each of the levels.

18. The face detection method according to claim 6, wherein, the face detection processing is carried out within a region set in advance for each of the levels of image according to the image size of the images for each of the levels.

19. The face detection method according to claim 7, wherein, the face detection processing is carried out within a region set in advance for each of the levels of image according to the image size of the images for each of the levels.

20. A digital camera, comprising:
    a processor,
    wherein the processor controls the method of classifying a plurality of images, generated by enlargement or reduction of time-wise successively captured images according to plurality of specific multipliers, into levels by image size of the images;
    sequentially reading out at one read-out unit at a time the images classified into each of the levels, using as the read-out unit a size that is smaller than the smallest image size from the image sizes of the classified images;
    carrying out face detection processing to detect images in which it is determined that a face is present in portions of image divided up into the read-out units, wherein when the face detection processing is repeatedly carried out to the time-wise successively captured images the number of candidate levels of the images used for the face detection processing for the next image is set based on the level(s) of image size of images in which it has been determined there is a face present so that the number of candidate levels is less that the total number of levels.

* * * * *